US011783136B2

United States Patent
Zenkel et al.

(10) Patent No.: US 11,783,136 B2
(45) Date of Patent: Oct. 10, 2023

(54) END-TO-END NEURAL WORD ALIGNMENT PROCESS OF SUGGESTING FORMATTING IN MACHINE TRANSLATIONS

(71) Applicant: Lilt, Inc., Portola Valley, CA (US)

(72) Inventors: Thomas Joachim Zenkel, Bamberg (DE); Joern Wuebker, Berlin (DE); John Sturdy DeNero, Berkeley, CA (US)

(73) Assignee: Lilt, Inc., Emeryville, CA (US)

( * ) Notice: Subject to any disclaimer, the term of this patent is extended or adjusted under 35 U.S.C. 154(b) by 312 days.

(21) Appl. No.: 17/245,888

(22) Filed: Apr. 30, 2021

(65) Prior Publication Data
US 2022/0366152 A1    Nov. 17, 2022

(51) Int. Cl.
   *G06F 40/58* (2020.01)
   *G06F 40/284* (2020.01)
   *G06N 3/045* (2023.01)

(52) U.S. Cl.
   CPC ............ *G06F 40/58* (2020.01); *G06F 40/284* (2020.01); *G06N 3/045* (2023.01)

(58) Field of Classification Search
   None
   See application file for complete search history.

(56) References Cited

U.S. PATENT DOCUMENTS

| 11,048,854 B2 * | 6/2021 | Beaver ..................... G06N 3/08 |
| 2020/0117715 A1 * | 4/2020 | Lee .......................... G06N 3/08 |
| 2021/0358491 A1 * | 11/2021 | Prabhavalkar ........ G10L 15/197 |

OTHER PUBLICATIONS

Zenkel et al, Adding Interpretable Attention to Neural Translation Models Improves Word Alignment, https://arxiv.org/abs/1901.11359, pp. 1-9, Jan. 31, 2019 (Year: 2019).*
Zhang et al, Look Backward and Forward: Self-Knowledge Distillation with Bidirectional Decoder for Neural Machine translation, https://arxiv.org/abs/2203.05248, pp. 1-12, Mar. 11, 2022 (Year: 2022).*

(Continued)

*Primary Examiner* — Linda Wong
(74) *Attorney, Agent, or Firm* — Baker Botts L.L.P.

(57) ABSTRACT

In an embodiment, the disclosure provides a programmed computer system implemented via client-server Software as a Service (SaaS) techniques that allows for machine translation of digital content. When translating digital content, linguists must translate more than just the text on the page. Formatting, for example, is a commonly used and important aspect of online content that is typically managed with tags, such as <b> for bold and <i> for italics. When linguists work, they must ensure these tags are placed accurately as part of the translation. Projecting tags accurately depends on successfully accomplishing the challenging task of word alignment. Unfortunately, if word alignment is inaccurate, it makes placing formatting tags very difficult. In an embodiment, the present disclosure provides a method of not only translating text, but also efficiently and accurately projecting tags from input text in one language to output text in another language.

20 Claims, 14 Drawing Sheets

(56) References Cited

OTHER PUBLICATIONS

Tamer Alkhouli et al., *On the Alignment Problem In Multi-Head Attention-Based Neural Machine Translation*, Proceedings of the Third Conference on Machine Translation (WMT), vol. 1: Research Papers, pp. 177-185, Oct. 31, 2018.

Philip Arthur et al., *Incorporating Discrete Translation Lexicons Into Neural Machine Translation*, In Proceedings of the 2016 Conference on Empirical Methods in Natural Language Processing, © 2016 Association for Computational Linguistics, pp. 1557-1567, Nov. 1, 2016.

Dzmitry Bahdanau et al., *Neural Machine Translation by Jointly Learning to Align and Translate*, International Conference on Learning Representations, arXiv:1409.0473v7 [cs.CL], pp. 1-15, May 19, 2016.

Peter F. Brown et al., *The Mathematics of Statistical Machine Translation: Parameter Estimation*, Computational linguistics, 19(2), pp. 263-311, Jun. 1, 1993.

John Denero et al., Model-Based Aligner Combination Using Dual Decomposition, Proceedings of the 49th Annual Meeting of the Association for Computational Linguistics: Human Language Technologies—vol. 1, © 2011 Association for Computational Linguistics, pp. 420-429, Jun. 19, 2011.

Chris Dyer et al., *A Simple, Fast, And Effective Reparameterization of IBM Model 2*, Proceedings of the 2013 Conference of the North American Chapter of the © 2013 Association for Computational Linguistics: Human Language Technologies, 6 pages, Jun. 1, 2013.

Carla Parra Escartin et al., *2015. Machine Translation Evaluation Made Fuzzier: A Study on Post-Editing Productivity and Evaluation Metrics In Commercial Settings.*, Proceedings of MT Summit XV, pp. 131-144, Oct. 30, 2015.

Qin Gao et al., 2008. *Parallel Implementations of Word Alignment Tool.* Software Engineering, Testing, And Quality Assurance For Natural Language Processing, © 2008 Association for Computational Linguistics, pp. 49-57, Jun. 1, 2008.

Sarthak Garg et al., *Jointly Learning to Align and Translate With Transformer Models*, Proceedings of the 2019 Conference on Empirical Methods in Natural Language Processing and the 9th International Joint Conference on Natural Language Processing (EMNLP-IJCNLP), © 2019 Association for Computational Linguistics, pp. 4453-4462, Nov. 3, 2019.

João Graca et al., 2008 *Expectation Maximization And Posterior Constraints*, Neural Information Processing Systems Conference (NIPS), Vancouver, BC, pp. 1-10, Dec. 1, 2007.

Eric Joanis et al., *Transferring Markup Tags In Statistical Machine Translation: A Two-Stream Approach*, Proceedings of MT Summit XIV Workshop on Post-Editing Technology Practice, pp. 73-81, Sep. 2, 2013.

Philipp Koehn et al. 2005 *Edinburgh System Description For The 2005 IWSLT Speech Translation Evaluation*, Proceedings of the Second International Workshop on Spoken Language Translation in International Workshop on Spoken Language Translation (IWSLT), 10 pages, Oct. 24, 2005.

Xintong Li et al. *On The Word Alignment from Neural Machine Translation*, Proceedings of the 57th Annual Meeting of the Association for Computational Linguistics, © 2019 Association for Computational Linguistics, pp. 1293-1303, Jul. 28, 2019.

Percy Liang et al., *Alignment by Agreement*, Proceedings of the Human Language Technology Conference of the North American Chapter of the Association of Computational Linguistics. Association for Computational Linguistics, pp. 104-111, Jun. 1, 2006.

I Dan Melamed, *Annotation Style Guide for The Blinker Project Version 1.0.4.* arXiv:cmp-lg/9805004, pp. 1-20, Oct. 26, 2018.

Rada Mihalcea et al., *An Evaluation Exercise for Word Alignment*, HLT-NAACL 2003 Workshop On Building And Using Parallel Texts Data Driven Machine Translation and Beyond, pp. 1-10, May 1, 2003.

Mathias Müller, *Treatment of Markup in Statistical Machine Translation*, Proceedings of the Third Workshop on Discourse in Machine Translation, pp. 36-46, Sep. 8, 2017.

Franz Josef Och et al., *A Comparison of Alignment Models for Statistical Machine Translation*. In COLING 2000 vol. 2: The 18th International Conference on Computational Linguistics, pp. 1086-1090, Jul. 31, 2000.

Franz Josef Och et al., 2000b. *Improved Statistical Alignment Models*, In Proceedings of the 38th Annual Meeting on Association for Computational Linguistics. Association for Computational Linguistics, pp. 440-447, Oct. 1, 2000.

Franz Josef Och et al., 2003. *A Systematic Comparison of Various Statistical Alignment Models*, Computational Linguistics, 29(1):pp. 19-51, Mar. 1, 2003.

Rico Sennrich et al., *Neural Machine Translation of Rare Words with Subword Units*, In Proceedings of the 54th Annual Meeting of the Association for Computational Linguistics (vol. 1: Long Papers), pp. 1715-1725, Aug. 7, 2016.

Elias Stengel-Eskin et al., *A Discriminative Neural Model for Cross-Lingual Word Alignment.*, In Proceedings of the 2019 Conference on Empirical Methods in Natural Language Processing and the 9th International Joint Conference on Natural Language Processing (EMNLP-IJCNLP), pp. 910-920, Nov. 3, 2019.

Akihiro Tamura et al., *Recurrent Neural Networks for Word Alignment Model*, In Proceedings of the 52nd Annual Meeting of the Association for Computational Linguistics (vol. 1: Long Papers). Association for Computational Linguistics. pp. 1470-1480, Jun. 23, 2014.

Arda Tezcan et al., 2011. *SMT-CAT Integration in A Technical Domain. Handling Xml Mark-Up Using Pre and Post-Editing Processing Methods*, in Proceedings of the 15th International Conference of the European Association for Machine Translation (EAMT-2011), Centre for Computational Linguistics, pp. 55-62, May 1, 2011.

Aashish Vaswani et al., 2017. Attention Is All You Need, In Advances in Neural Information Processing Systems, 11 pages, Dec. 6, 2017.

Stephan Vogel et al., *HMM-Based Word Alignment In Statistical Translation*, In COLING 1996 vol. 2: The 16th International Conference on Computational Linguistics, pp. 836-841, Aug. 1, 1996.

Thomas Zenkel et al., *Adding Interpretable Attention to Neural Translation Models Improves Word Alignment*, 2019 arXiv preprint arXiv:1901.11359, 9 pages, Jan. 31, 2019.

Thomas Zenkel et al., *End-to-End Neural Word Alignment Outperforms GIZA++*, arXiv: 2004.14675v1, 13 pages, Apr. 30, 2020.

\* cited by examiner

# US 11,783,136 B2

END-TO-END NEURAL WORD ALIGNMENT PROCESS OF SUGGESTING FORMATTING IN MACHINE TRANSLATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Lilt, Inc.

TECHNICAL FIELD

One technical field of the present disclosure is computer-implemented neural machine translation of electronic documents into different human-readable languages. Another technical field is computer-implemented word alignment techniques to transfer text annotations, such as formatting, from source to target.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-implemented word alignment processes once played a role in machine translation (MT) systems, but now primarily find use to inject an external lexicon into the MT inference process to enforce the use of domain-specific terminology or improve the translations of low-frequency content words. FIG. 1A illustrates an output word alignment that a human annotator might generate. Word alignment also finds use to transfer text annotations from source to target. For example, if part of a source sentence is underlined, the corresponding part of its translation should be underlined also. For published documents, tags in HTML and other markup languages should be transferred. Word alignment facilitates transferring annotations when annotations are unavailable in MT training datasets.

Examples of annotations that may be transferred include underlining, HTML tags, italicization, sentiment annotations, entity annotations, intent annotations, relationship annotations, highlighting, coloring, bolding, superscript, subscript, strikethrough, font, comments, footnotes, or links from the source sentence to the target sentence. A sentiment annotation may be a label that indicates that text has a positive, negative, or neutral emotional content. An intent annotation may classify the need or desire behind text, and it may categorize the text as a request, command, request, or confirmation. A semantic annotation may attach tags to text that reference entities or concepts, such as people, places, taxonomies, ideas, or topics. A relationship annotation may signify a relationship between two or more different pieces of text, for example where one piece of text depends on another, or when each piece of text refers to the other. Entity annotations may signify that a piece of text represents an entity; the entity may be a proper noun, a keyword or key phrase, or a part-of-speech.

The Transformer architecture is widely used in neural machine translation, but its structure makes interpreting attention activations as word alignments difficult. GIZA++ and FastAlign software are in wide use to infer word alignments, based on statistical word alignment models developed by IBM in the early 1990s. However, statistical alignment methods make various assumptions of probabilistic independence that prevent them from fully modeling the context-sensitive nature of human language. The best performing statistical alignment methods contain an explicit bias toward contiguous word alignments in which adjacent source words are aligned to adjacent target words. This explicit bias is expressed in statistical systems using a hidden Markov model or symmetrization heuristics such as the grow-diag-final algorithm. Other neural alignment methods require using the output of IBM models during training to achieve acceptable performance, which can propagate the errors of the IBM models. Practitioners are constantly looking for better performance than offered by the IBM models. If the foregoing issues could be overcome with performance better than the IBM models, the resulting solution would represent a distinct advance in the state of the art.

SUMMARY

The appended claims may serve as a summary of the invention.

DETAILED DESCRIPTION

Figure 1A:
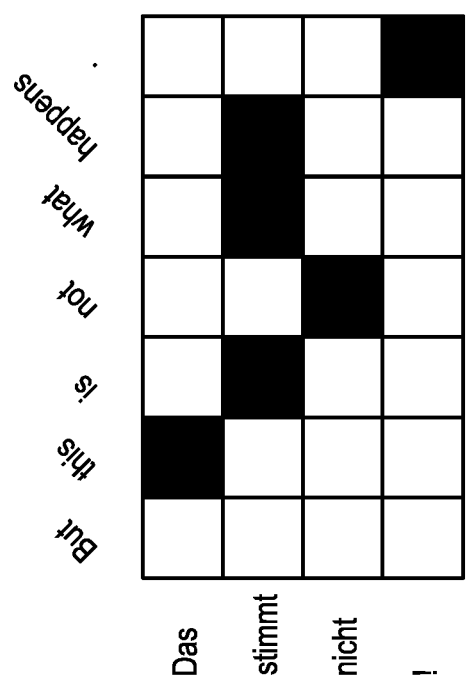
FIG. 1A illustrates an output word alignment that a human annotator might generate.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In an embodiment, a computer-implemented word alignment method functions to transfer text annotations from source to target and incorporates an auxiliary loss function that can be used with any attention-based network to encourage contiguous attention matrices. Furthermore, heuristic symmetrization of word alignments is replaced with an activation optimization technique. After training two alignment models that translate in opposite directions, in an embodiment, a symmetrized attention matrix is inferred; the matrix jointly optimizes the likelihood of the correct output words under both models in both languages. Embodiments have been found, in experimentation, to consistently yield higher alignment quality than GIZA++ using a fully unsupervised neural model that does not use the output of a statistical alignment model.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. GENERAL OVERVIEW
2. STRUCTURAL & FUNCTIONAL OVERVIEW
  2.1. THE ALIGNMENT TASK
  2.2 ATTENTION-BASED TRANSLATION MODELS
  2.3 ALIGNMENT LAYER
  2.4 ATTENTION OPTIMIZATION
  2.5 FULL CONTEXT MODEL WITH GUIDED ALIGNMENT LOSS
  2.6 CONTIGUITY LOSS
  2.7 BIDIRECTIONAL ATTENTION OPTIMIZATION
  2.8 EXPERIMENTAL RESULTS
    2.8.1 DATA AND TRAINING
    2.8.2 CONTIGUITY LOSS EXPERIMENTS
    2.8.3 BIDIRECTIONAL ATTENTION OPTIMIZATION EXPERIMENTS
    2.8.4 GUIDED ALIGNMENT TRAINING
3. IMPLEMENTATION EXAMPLE—HARDWARE OVERVIEW

1. GENERAL OVERVIEW

In an embodiment, the disclosure provides a programmed computer system implemented via client-server Software as a Service (SaaS) techniques that allows for machine translation of digital content. When translating digital content, linguists must translate more than just the text on the page. Formatting, for example, is a commonly used and important aspect of online content that is typically managed with tags, such as <b> for bold and <i> for italics. When linguists work, they must ensure these tags are placed accurately as part of the translation. Projecting tags accurately depends on successfully accomplishing the challenging task of word alignment. Unfortunately, if word alignment is inaccurate, it makes placing formatting tags very difficult. In an embodiment, the present disclosure provides a system for not only translating text, but also efficiently and accurately projecting tags from input text in one language to output text in another language. The methods of this disclosure, in part, aim for words comprising output text to accurately correspond to words comprising input text, not only meaning, but also in their formatting or annotation.

Text stored in volatile or non-volatile memory accessible by computing device may be formatted or annotated in a myriad of ways. For example, text displayed in a graphical user interface may be bolded, highlighted, underlined, italicized, superscripted, subscripted, shown with a strikethrough, or colored. Some words in a string of text may be in one font, while other words are in a different font. Text may be annotated with markup tags, such as HTML tags, XML tags, SGML tags, LaTeX tags, or other markup tags. Text may have other types of tags or categorical labels, or it may be associated with certain links, such as hyperlinks. Text may be associated with comments or footnotes. Importantly, in the context of machine translation, text may be annotated with tags associated with a machine learning model such as sentiment annotations, entity annotations, intent annotations, or relationship annotations. It should be understood that text may be tagged, formatted, or annotated in a variety of other ways.

In an embodiment, a distributed computer system is programmed to facilitate tag projection in the context of neural machine translation. It should be understood that systems and methods that project tags may also be used to project formatting and annotations, and that these terms refer to a variety of data or metadata that may be associated with electronically stored text. Moreover, "forward" in the context of this disclosure refers to a first direction of translation (e.g., English to German), while "backward" refers to the opposite direction of translation (e.g., German to English).

In a first example method, an annotation transfer task begins by storing in main memory an encoding, which is a tokenized vocabulary of a source language and a target language. Next, the first example method may proceed by training a forward neural model and a forward alignment layer programmatically coupled to the forward neural mode & training a backward neural model and a backward alignment layer programmatically coupled to the backward neural mode. The forward and backward neural models may each be Transformer submodels. The forward and backward alignment layers may each have an attention optimization sub-network programmed to find predictive attention activations while encouraging contiguity (using an auxiliary loss function).

In the first example method, the annotation transfer task may continue by storing in main memory a representation of a source sentence and a target sentence. For example, by running the source sentence through the forward model. A representation may be characterized as a vector obtained when running tokens (that represent a sentence) through a model. Next, the first example method may proceed by extracting, based on the source sentence and target sentence, forward attention logits from the forward alignment layer and backward attention logits from the backward alignment layer. After the attention logits are extracted, the first example method may continue by inferring, through gradient descent, a symmetrized attention matrix that jointly optimizes output under both models in both languages. Gradient descent may be initialized with an average of the extracted forward/backward attention logits. At this point, the first example method may continue by generating, based on the symmetrized attention matrix, hard alignments between source words comprising source tokens in the source sentence and target words comprising target tokens in the target sentence. Finally, annotations can be transferred from the source sentence to the target sentence based on the hard alignments.

A second example method directed to annotation projection begins by extracting a plurality of alignments using the above-described first example method with a bidirectional model. Next, guided alignment training may proceed by adding an additional unmasked self-attention sublayer (a guided alignment layer) on top of the existing neural model. The second guided alignment layer may be trained using the extracted alignments. Attention optimization would not be applied in the second example method, because it would not be possible (a guided alignment layer is directly trained to predict alignments and not trained to predict a next token). At this point, the second example method may proceed by generating hard alignments for another source sentence pair and its translation and projecting annotations into the corresponding translation based on those hard alignments.

In one embodiment, the disclosure provides a computer-implemented method, comprising storing, in computer main memory, an encoding comprising a tokenized vocabulary of a source language and a target language; training, using the encoding, a forward neural model programmed for translating from the source language to the target language, a forward alignment layer that is programmatically coupled to the forward neural model, a backward neural model for translating from the target language to the source language, and a backward alignment layer that is programmatically coupled to the backward neural model, each of the forward neural model and the backward neural model comprising a Transformer submodel with a multilayer encoder, a multilayer decoder, multidimensional hidden states, and multidimensional embedding vectors, and each of the forward alignment layer and the backward alignment layer comprising an attention optimization sub-network programmed to find predictive attention activations while encouraging contiguity, adjacent source words being biased to align to adjacent target words by using an auxiliary loss function; storing, in computer main memory, a pairing comprising a source representation of a source sentence associated with the source language and a corresponding target representation of a target sentence associated with the target language; extracting, based on the source representation and the target representation, forward attention logits from the forward alignment layer and backward attention logits from the backward alignment layer; programmatically inferring, through gradient descent that is initialized with an average of the extracted forward and backward attention logits, a symmetrized attention matrix that jointly optimizes the likelihood of the pairing under the forward neural model and the backward neural model; and generating and digitally storing, based on the symmetrized attention matrix, a plurality of first hard alignments between source words comprising source tokens in the source sentence and target words comprising target tokens in the target sentence.

In an embodiment, each Transformer submodel comprises a 6-layer encoder, a 3-layer decoder, 8 attention heads per layer, 256-dimensional hidden states, and 256-dimensional embedding vectors; each alignment layer comprises 256-dimensional hidden states, 256-dimensional embedding vectors, and one attention head; and each Transformer submodel and each alignment layer uses a dropout rate of 0.1.

In an embodiment, the first hard alignments are generated by generating one or more alignment links that programmatically associate one or more source tokens with one or more target tokens, and generating a first hard alignment between each source word and each target word respectively comprising a source token and a target token programmatically associated by an alignment link.

In an embodiment, underlining, an HTML tag, an XML tag, an SGML tag, a LaTeX tag, italicization, a sentiment annotation, an entity annotation, an intent annotation, a relationship annotation, highlighting, coloring, bolding, superscript, subscript, strikethrough, font, a comment, a footnote, or a link are some of the types of tags that may be projected based on the generated first hard alignments. In an embodiment, the target sentence may be stored with the projected tags in computer main memory In an embodiment, projecting the one or more tags based on the generated first hard alignments comprises executing: determining, for each opening tag corresponding to a closing tag in the source sentence, a corresponding source tag span; calculating, for each corresponding source tag span, an alignment score for every possible target tag span; and projecting, into the target sentence, from each corresponding source tag span to a possible target tag span with the highest alignment score, the opening and closing tags.

In an embodiment, the first hard alignments are generated by: (1) transforming the attention logits from the symmetrized attention matrix into forward and backward attention probabilities using a softmax( ) function; (2) merging the forward and backward attention probabilities into attention scores using a Hadamard product; and (2) selecting min(n, m) alignments that have the highest values in the merged attention scores, wherein n is a number of source tokens and m is a number of target tokens.

In an embodiment, a guided machine learning model for accomplishing an alignment task may be employed by: programmatically uncoupling the forward alignment layer and the backward alignment layer from the forward neural mode and the backward neural model respectively; programmatically coupling a guided alignment layer comprising an unmasked self-attention sublayer to the forward neural model and the backward neural model; training, with a plurality of hard alignments that includes the first hard alignments, using the encoding, the guided alignment layer; storing, in computer main memory, a second pairing comprising a second source representation of a second source sentence associated with the source language and a corresponding second target representation of a second target sentence associated with the target language; extracting, based on the second source representation and the second target representation, guided attention logits from the guided alignment layer; and generating, based on the extracted guided attention logits, guided hard alignments between second source words comprising second source tokens in the second source sentence and second target words comprising second target tokens in the second target sentence.

In an embodiment, each Transformer submodel comprises a 6-layer encoder, a 3-layer decoder, 8 attention heads per layer, 256-dimensional hidden states, and 256-dimensional embedding vectors; the forward and backward alignment layer each comprise 256-dimensional hidden states, 256-dimensional embedding vectors, and one attention head; and each Transformer submodel and each of the forward and backward alignment layer use a dropout rate of 0.1.

In an embodiment, guided hard alignments are generated by generating one or more alignment links that programmatically associate one or more second source tokens with one or more second target tokens; and generating a guided hard alignment between each second source word and each second target word respectively comprising a second source token and a second target token programmatically associated by an alignment link.

In an embodiment, underlining, an HTML tag, an XML tag, an SGML tag, a LaTeX tag, italicization, a sentiment annotation, an entity annotation, an intent annotation, a relationship annotation, highlighting, coloring, bolding, superscript, subscript, strikethrough, font, a comment, a footnote, or a link are some of the types of tags that may be projected based on the generated guided hard alignments. In an embodiment, the second target sentence may be stored with the projected tags in computer main memory.

In an embodiment, projecting the one or more tags based on the generated guided hard alignments comprises executing: determining, for each opening tag corresponding to a closing tag in the second source sentence, a corresponding source tag span; calculating, for each corresponding source tag span, an alignment score for every possible target tag span; and projecting, into the second target sentence, from each corresponding source tag span to a possible target tag span with the highest alignment score, the opening and closing tags.

In an embodiment, a guided machine learning model for accomplishing an alignment task may be employed by: programmatically uncoupling the forward alignment layer and the backward alignment layer from the forward neural mode and the backward neural model respectively; programmatically coupling a guided alignment layer comprising an unmasked self-attention sublayer to the forward neural model; training, with a plurality of hard alignments that includes the first hard alignments, using the encoding, the guided alignment layer; storing, in computer main memory, a second pairing comprising a second source representation of a second source sentence associated with the source language and a corresponding second target representation of a second target sentence associated with the target language; extracting, based on the second source representation and the second target representation, guided attention logits from the guided alignment layer; and generating, based on the extracted guided attention logits, guided hard alignments between second source words comprising second source tokens in the second source sentence and second target words comprising second target tokens in the second target sentence.

In an embodiment, each Transformer submodel comprises a 6-layer encoder, a 3-layer decoder, 8 attention heads per layer, 256-dimensional hidden states, and 256-dimensional embedding vectors; the forward and backward alignment layer each comprise 256-dimensional hidden states, 256-dimensional embedding vectors, and one attention head; and each Transformer submodel and alignment layer use a dropout rate of 0.1.

In an embodiment, guided hard alignments are generated by generating one or more alignment links that programmatically associate one or more second source tokens with one or more second target tokens; and generating a guided hard alignment between each second source word and each second target word respectively comprising a second source token and a second target token programmatically associated by an alignment link.

In an embodiment, underlining, an HTML tag, an XML tag, an SGML tag, a LaTeX tag, italicization, a sentiment annotation, an entity annotation, an intent annotation, a relationship annotation, highlighting, coloring, bolding, superscript, subscript, strikethrough, font, a comment, a footnote, or a link are some of the types of tags that may be projected based on the generated guided hard alignments. In an embodiment, the second target sentence may be stored with the projected tags in computer main memory.

In an embodiment, projecting the one or more tags based on the generated guided hard alignments comprises executing: determining, for each opening tag corresponding to a closing tag in the second source sentence, a corresponding source tag span; calculating, for each corresponding source tag span, an alignment score for every possible target tag span; and projecting, into the second target sentence, from each corresponding source tag span to a possible target tag span with the highest alignment score, the opening and closing tags.

2. STRUCTURAL & FUNCTIONAL OVERVIEW

In embodiments, the present disclosure provides systems and methods to translate input text from one language (a "source language") into output text in another language (a "target language") such that, after undergoing neural machine translation, the translated text has output annotations corresponding to input annotations associated with the input text. Other embodiments provide systems or methods for training machine learning models in the task of tag projection task, annotation projection, or formatting projection. Embodiments involve training models with various submodels and programmatically coupled layers. In some embodiments, one model is trained in a forward direction, for translating from the source language to the target language, and another is trained in a backward direction, for translating from the target language to the source language, before each model is used in a system or method for tag projection.

In embodiments, the input text is tokenized, by an encoding process, into source tokens that represent either words or subwords, comprising characters, before undergoing translation. Byte pair encoding is one of a handful of different methods for representing a large vocabulary corpus using a fixed-size vocabulary. The disclosed technology may apply to any word-based or word-piece-based representation of text. In embodiments, the translated text may also be represented as tokens before eventually being decoded into the common speech of the target language. Embodiments involve training a model for aligning tokens or words in the input text with tokens or words in the output text. In some embodiments, a tag, annotation, or formatting projection task is carried out by first creating alignments between words or tokens, and then projecting tags, annotations, or formatting based on those alignments. Alignments may comprise alignment links between words or tokens in the source language and words or tokens in the target language. In embodiments, alignment links may be characterized as links between alignment points that share the same meaning in each language.

Figure 1B:
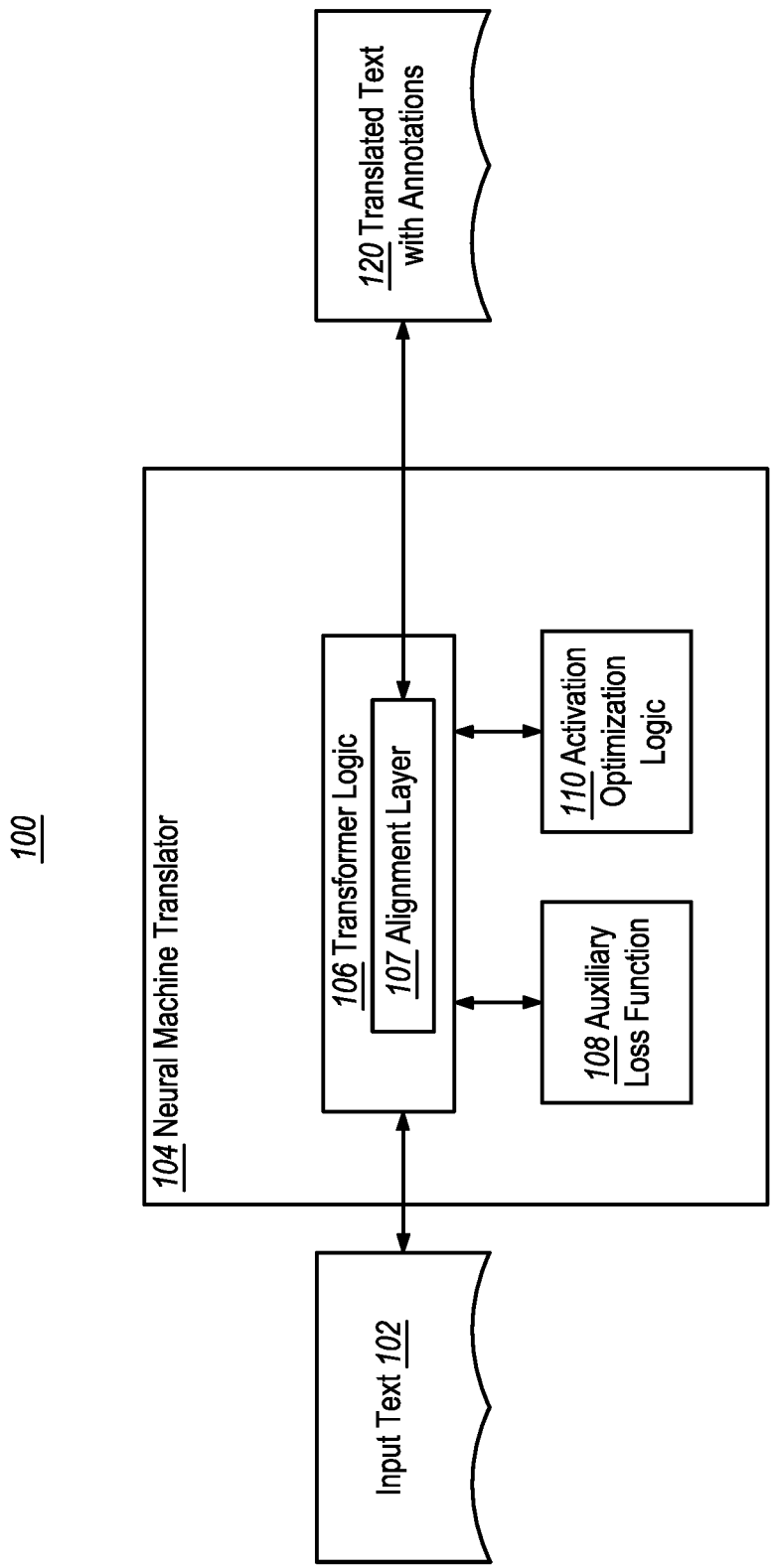
FIG. 1B illustrates a distributed computer system showing the context of use and principal functional elements with which one embodiment could be implemented.

FIG. 1B illustrates a distributed computer system showing the context of use and principal functional elements with which one embodiment could be implemented. In an embodiment, an online distributed computer system or platform for machine translation provides an interactive interface for translation-related tasks. In an embodiment, computer system 100 comprises a Neural Machine Translator 104 comprising Transformer Logic 106 which is responsible for translating raw text without annotations. The Neural Machine Translator may be programmed to translate Input Text 102 comprising text in a source language into Translated Text with Annotations 120 comprising text in a target language with output annotations corresponding to any annotations that were present in the Input Text 102. The Transformer Logic 106 is programmatically coupled to an Auxiliary Loss Function 108 and Activation Optimization Logic 110. An Alignment Layer 107 rests on top of the Transformer Logic 106, and functional elements of the Neural Machine Translator 104 programmatically coupled to Transformer Logic 106 are also programmatically coupled to the Alignment Layer 107.

In embodiments, the Alignment Layer 107 is responsible for a word alignment task which is precedent to a tag projection task. The Alignment Layer may be programmed to perform word alignment for direct translation purposes or for the purpose of training models or submodels in word alignment, said models or submodels configured to perform word alignment in subsequent translation. The Auxiliary Loss Function 108 may aid the Alignment Layer 107 by biasing the Alignment Layer 107 to generate contiguous word alignments. Using the function, adjacent source words are aligned to adjacent target words. The Activation Optimization Logic 110 may aid the Alignment Layer 107 by directly optimizing attention activations in the Alignment Layer 107 using gradient descent.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1B illustrates only one of many possible arrangements of components configured to execute the programming described herein. Other arrangements may include fewer or different components, and the division of work between the components may vary depending on the arrangement.

FIG. 1B, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Each diagram herein of a data flow or process flow is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

2.1 The Alignment Task

The machine-implemented task of generating an alignment may be expressed mathematically, as a basis for computer program implementation, as follows. Given a source-language sentence $x=x_1, \ldots, x_n$ of length n and its target-language translation $y=y_1, \ldots, y_m$ of length m, an alignment A is a set of pairs of source and target positions:

$$A \subseteq \{(s,t): s \in \{1, \ldots, n\}, t \in \{1, \ldots, m\}\}$$

Aligned words are assumed to correspond to one another. That is, the source word and the target word are translations of each other within the context of the sentence. Gold alignments can be generated by multiple annotator routines based on the Blinker guidelines. Alignment error rate (AER) can be used to compare automatically generated alignments to gold alignments.

2.2 Attention-Based Translation Models

Attention-based neural networks for MT may comprise an encoder for the source sentence and a decoder that has access to the previously generated target tokens and generates the target sequence from left to right. Before prediction of a token, the decoder "attends" to the position-wise source representations generated by the encoder, and it produces a context vector that is a weighted sum of the contextualized source embeddings.

With Transformer, a query Q and a set of k key-value pairs K, V are used with $Q \in R^d$ and $V, K \in R^{k \times d}$. Attention logits $A_L$ computed by a scaled dot product are converted into a probability distribution A using the softmax function. The attention A serves as mixture weights for values V to form a context vector c:

$$A_L = calcAttLogits(Q, K) = \frac{Q \cdot K^T}{\sqrt{d}}$$

$$A = calcAtt(Q, K) = \text{softmax}(A_L)$$

$$c = applyAtt(A, V) = A \cdot V$$

The Transformer attention mechanism is widely used and includes multiple attention heads whose context vectors are stacked to form the context activation for a layer, and the encoder and decoder have multiple layers. In one experimental embodiment, a Transformer model may be trained for translation with a 6-layer encoder, a 3-layer decoder, and 256-dimensional hidden states and embedding vectors. For word alignment, such a translation Transformer may be used to extract representations of the source and the target sequences. The alignment techniques of this disclosure do not change the parameters of the Transformer. Therefore, any improvements to the translation system may carry over to alignment quality, and the alignment component does not affect translation output.

2.3 Alignment Layer

In an embodiment, an additional alignment layer on the Transformer architecture can improve alignment quality achieved by interpreting attention activations. In the alignment layer, the context vector is computed as apply Att(A, V), just as in other decoder layers, but this context vector is the only input to predicting the target word via a linear layer and a softmax that gives a probability distribution over the target vocabulary. This design forces attention onto the source positions that are most useful in predicting the target word.

Figure 2:
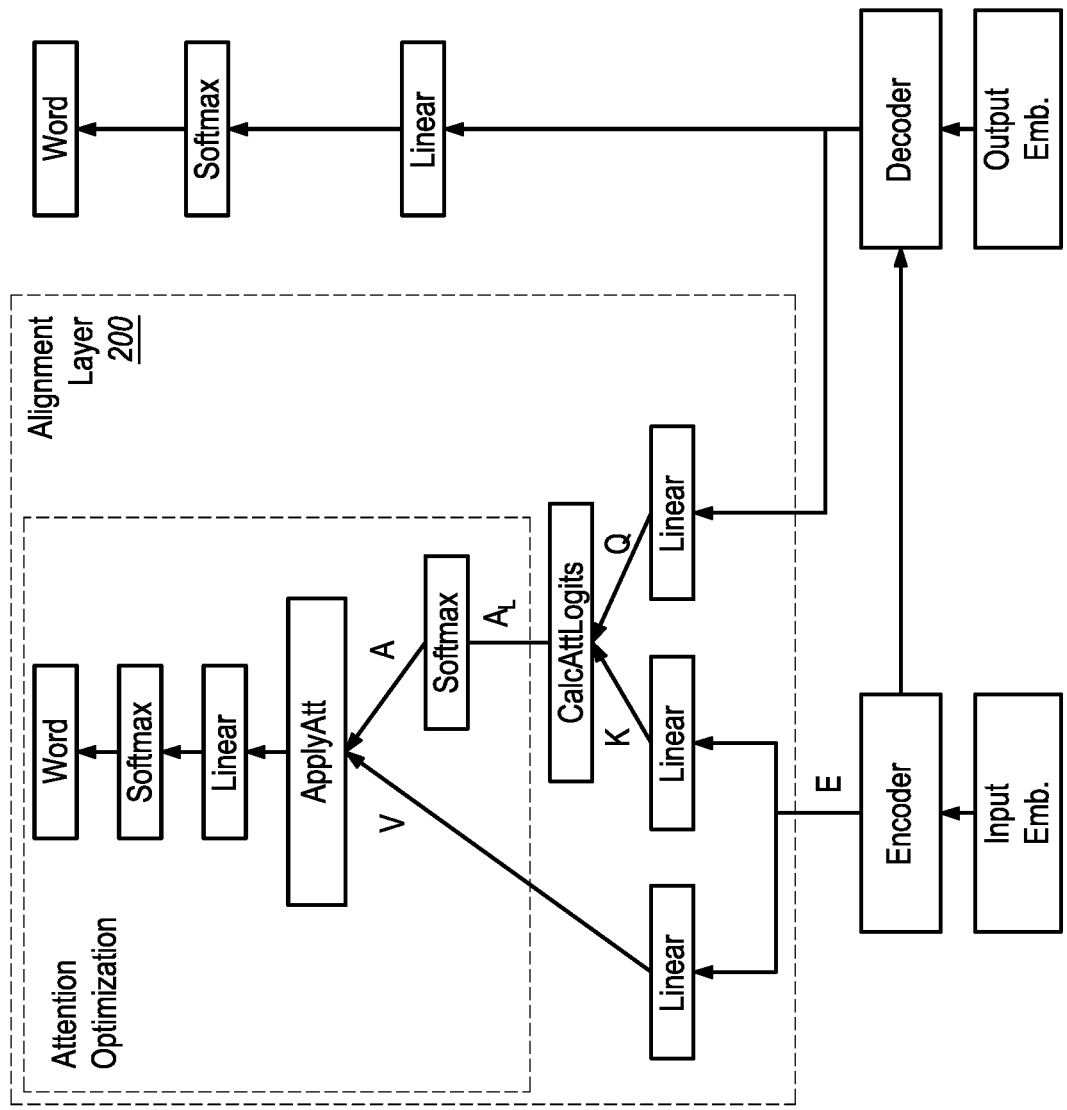
FIG. 2 illustrates an example data flow and process of an alignment layer.

FIG. 2 illustrates an example data flow and process of an alignment layer 200. In an embodiment, the alignment layer 200 uses the learned representations of the underlying translation model. Alignments can be extracted from the activations of the model by executing a forward pass to obtain the attention weights A from the alignment layer 200 and subsequently selecting the maximum probability source position for each target position as an alignment link:

$\{(\mathrm{argmax}_i(A_{i,j}), j) : j \in [1, m]\}$.

The alignment layer 200 predicts the next target token $y_i$ based on the source representations x extracted from the encoder of the Transformer and all past target representations $y<_i$ extracted from the decoder. Thus, the probability is conditioned as $p(y_i|x, y<_i)$. The encoder representation used as key and value for the attention component is the sum of the input embeddings and the encoder output. This ensures that lexical and context information are both salient in the input to the attention component.

2.4 Attention Optimization

Extracting alignments with attention-based models works when used in combination with greedy translation inference. However, the alignment task involves predicting an alignment between a sentence and an observed translation, which requires forced decoding. When a token in the target sentence is unexpected given the preceding target prefix, attention activations computed during forced decoding are not reliable because they do not explicitly condition on the target word being aligned.

Attention optimization is a known method to search for attention activations that maximize the probability of the output sequence by directly optimizing the attention activations A in the alignment layer using gradient descent for a given sentence pair (x, y) to maximize the probability of each target token $y_i$ while keeping all other parameters of the neural network M fixed:

$\mathrm{argmax}_A p(y_i | y_{<i}, x, A; M)$

Attention optimization yields superior alignments when used during forced decoding when gradient descent is initialized with the activations from a forward pass through the alignment layer.

2.5 Full Context Model with Guided Alignment Loss

The models disclosed in preceding sections are based on autoregressive translation models, so they are limited to only attend to the left context of the target sequence. However, for the word alignment task, the current and future target context is also available and should be considered when inferences are formed. In one approach, a single model is trained to both predict the target sentence and the alignments using guided alignment training. When the model is trained to predict alignments, the full target context can be used to obtain improved alignment quality.

The alignment loss is supervised via a set of alignment links for each sentence pair in the training data. These alignments can be generated by the current model, or can be provided by an external alignment system, or by human annotators. Assuming one alignment link per target token, the alignment source position for the target token at position t may be denoted as $a_t$. Target tokens that do not have an alignment link are presumed to be aligned to the end-of-sentence (EOS) token of the source sequence. The guided alignment loss $L_a$, given attention probabilities $A_{a_t,t}$ for each source position $a_t$ and target position t for a target sequence of length m is defined as:

$$L_a(A) = -\frac{1}{m}\sum_{i=1}^{m}\log(A_{a_t,t})$$

In an embodiment, an additional self-attention component may be inserted into the alignment layer, while the encoder and decoder of the Transformer is left unchanged. Such an insertion does not require updating any translation model parameters but may be effectuated by optimizing the alignment layer parameters with guided alignment loss. In an embodiment, adding an alignment layer for guided alignment training has a small parameter overhead as it only adds a single decoder layer, potentially resulting in less than a five percent increase in parameters. In such an embodiment, the current and future target context are not masked in the alignment layer self-attention component in order to provide the full target sentence as context, and alignment layer parameters are trained using the guided alignment loss.

2.6 Contiguity Loss

Contiguous alignment connections are very common in word alignments, especially for pairs of Indo-European languages. Expressed symbolically, if a target word at position t is aligned to a source word at position s, then the next target word at position (t+1) is often aligned to (s−1), s, or (s+1). In an embodiment, a loss function that encourages alignments with contiguous clusters of links may be used to improve alignment quality.

In an embodiment, the attention activations may be formed into a 2-dimensional matrix $A \in \mathbb{R}^{n \times m}$, where n is the number of source tokens and m is the number of target tokens: each entry represents a probability that specifies how much attention weight the network puts on each source token to predict the next target token. By using a convolution with a static kernel K over these attention scores, how much attention is focused on each rectangle within the two-dimensional attention matrix may be measured as:

$$\overline{A} = conv(A, K)$$

$$L_C = -\sum_{t=1}^{m}\log\left(\max_{s \in \{1,\ldots,n\}}(\overline{A}_{s,t})\right)$$

In an embodiment, a 2×2 kernel $K \in \mathbb{R}^{2 \times 2}$ may be employed with each element set to 0.5. Therefore, $\overline{A} \in \mathbb{R}^{n \times m}$ will contain the normalized attention mass of each 2×2 square of attention matrix A. Resulting values after convolution will be in the interval [0.0,1.0]. For each target word, the square with the highest attention mass may be selected, encouraging a sparse distribution over source positions in $\overline{A}$, and effectively training the model towards strong attention values on neighboring positions. The contiguity loss may be masked such that the end of the sentence symbol is not considered during this procedure. A position-wise dropout of 0.1 may be applied on the attention logits before using the softmax function to obtain A, potentially avoiding finding trivial solutions during training such as aligning each target token to the same source token. In other embodiments, a 3×3 kernel, a 4×4 kernel, a 5×5 kernel, or a kernel of another size may be used.

Figure 3:
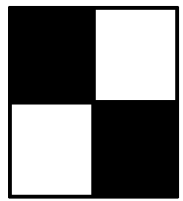
FIG. 3 illustrates example alignment patters observed for embodiments biasing towards contiguity with an auxiliary loss function.
Figure 3:
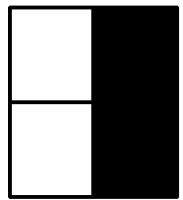
Figure 3:
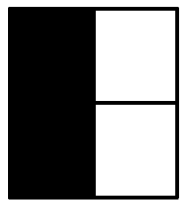
Figure 3:
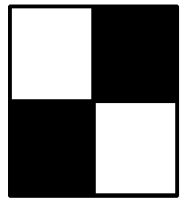

FIG. 3 illustrates example alignment patterns observed for embodiments biasing towards contiguity with an auxiliary loss function. Optimizing the alignment loss may especially encourage achieving diagonal and horizontal patterns as visualized in FIG. 3. Achieving such patterns may be favorable as they correspond to a large portion of patterns appearing in human alignment annotations as shown in FIG. 1A.

2.7 Bidirectional Attention Optimization

Word alignments may be extracted by training two models, one for the forward direction (source to target) and one for the backward direction (target to source). For each model, separate world alignments may be extracted and symmetrized using heuristics like grow-diagonal. However, such an approach is limited in that it uses hard word alignments of both directions as input, but not any other information of the forward or backward models.

Figure 4:
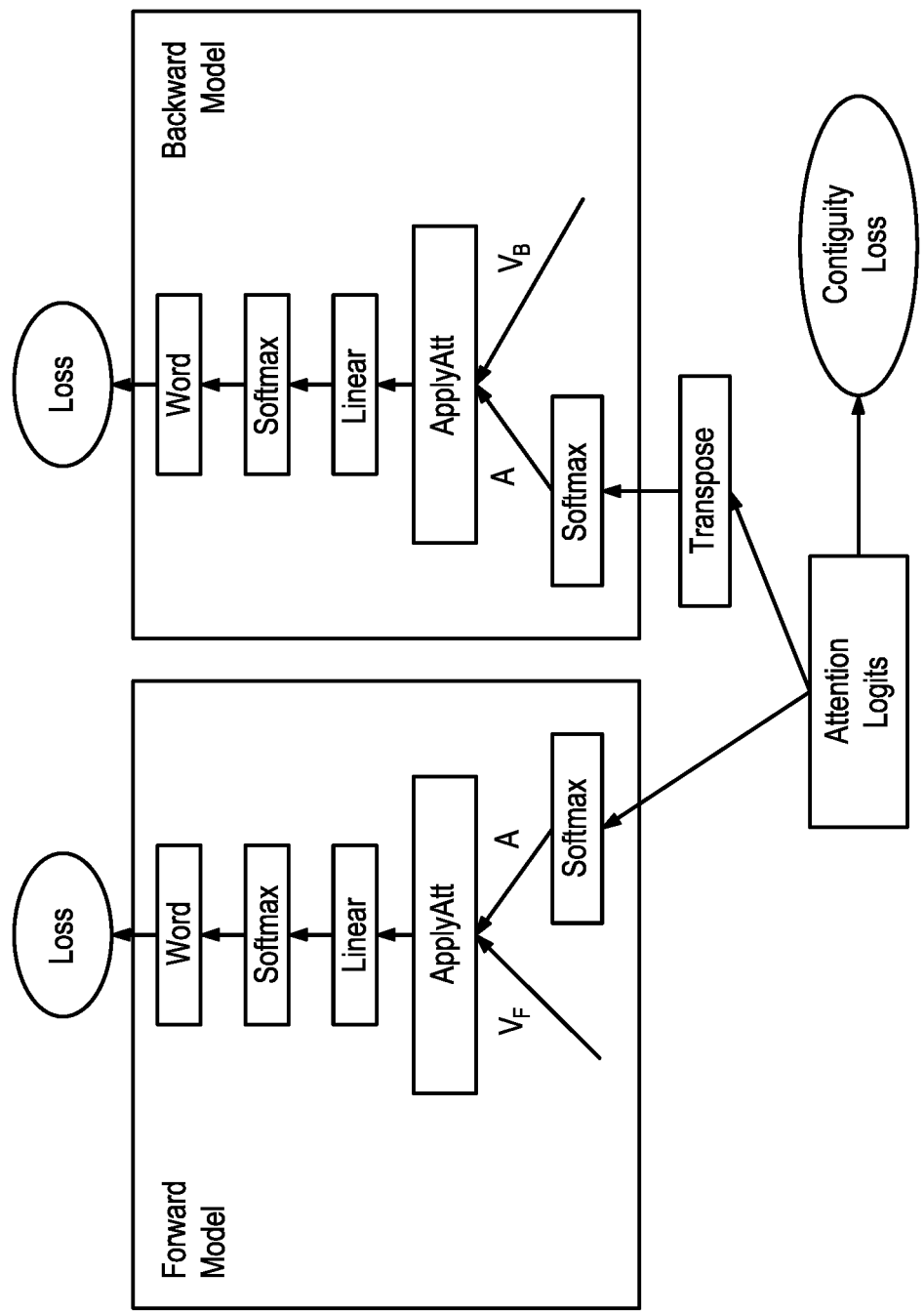
FIG. 4 illustrates attention optimization, in an embodiment.

FIG. 4 illustrates attention optimization, in an embodiment. In the attention-based neural network context, it is possible to adapt attention optimization to consider two models at the same time, potentially leading to more correct prediction of the target sequence than for a single neural network. In an embodiment, this procedure may be extended by optimizing the likelihood of the sentence pair jointly under both the forward and backward model by introducing additional bias to favor contiguous alignments.

FIG. 4 depicts optimizing attention logits towards the correct prediction of the next token when used for both the forward and backward model. The attention values $V_f$ and $V_b$ extracted from the forward and backward model remain static. Additionally, the attention logits are biased towards producing contiguous alignments.

In an embodiment, attention optimization uses gradient descent to find good attention activations, necessitating a reasonable starting initialization. Attention logits (attention before applying the softmax) may be extracted from the forward model $(A_L)_F$ and backward model $(A_L)_B$ and averaged to obtain a starting point for gradient descent: $(A_L)_{init} = \frac{1}{2}((A_L)_F + (A_L)_B{}^T)$.

In an embodiment, optimization operations are performed to find attention logits $A_L$ that lead to a correct prediction for both the forward model $M_F$ and the backward model $M_B$, while also representing contiguous alignments. Cross entropy loss CE may be used for a whole target sequence y of length m to define the loss, given probabilities for each target token $p(y_t|A_t; M)$ under model parameters M and a given attention activation vector $A_t$:

$$CE(p(y \mid A; M)) = \sum_{t=1}^{m} -\log(p(y_t \mid A_t; M))$$

If x, y are the source and target sequence, then a loss function may be defined for each component with an interpolation parameter $\lambda$ for the contiguity loss $L_C$ as follows:

$L_F = CE(p(y|\text{softmax}(A_L); M_F))$ $L_B = CE(p(x|\text{softmax}(A_L{}^T); M_B))$ $L = L_F + L_B + \lambda L_C$ In an embodiment, $\lambda = 1.0$. In an embodiment, $\lambda = 5.0$, which may lead to a lower AER. In other embodiments, the $\lambda$ parameter may have a different value.

In an embodiment, gradient descent is applied to optimize all losses simultaneously, thus approximating a solution of $\text{argmin}_{A_L} L(x, y|A_L, M_F, M_B)$.

In an embodiment, alignment link extraction, wherein soft attentions are converted to hard alignments, may follow optimizing attention logits. In an embodiment, the alignment with the highest attention score may be extracted for each target token. For example, the attention probabilities extracted from each direction may be merged using element-wise multiplication, where $\otimes$ denotes a Hadamard product:

$A_F = \text{softmax}(A_L)$ $A_B = \text{softmax}(A_L{}^T)^T$ $A_M = A_F \otimes A_B$ This approach favors alignments that effectively predict observed words in both the source and target sentences.

In an embodiment, given the number of source tokens n and the number of target tokens m in the sentence, min(n, m) alignments may be selected that have the highest values in the merged attention scores $A_M$. In contrast to selecting one alignment per target token, this approach may allow for unaligned tokens or one-to-many, many-to-one, or many-to-many alignment patterns.

Figure 1C:
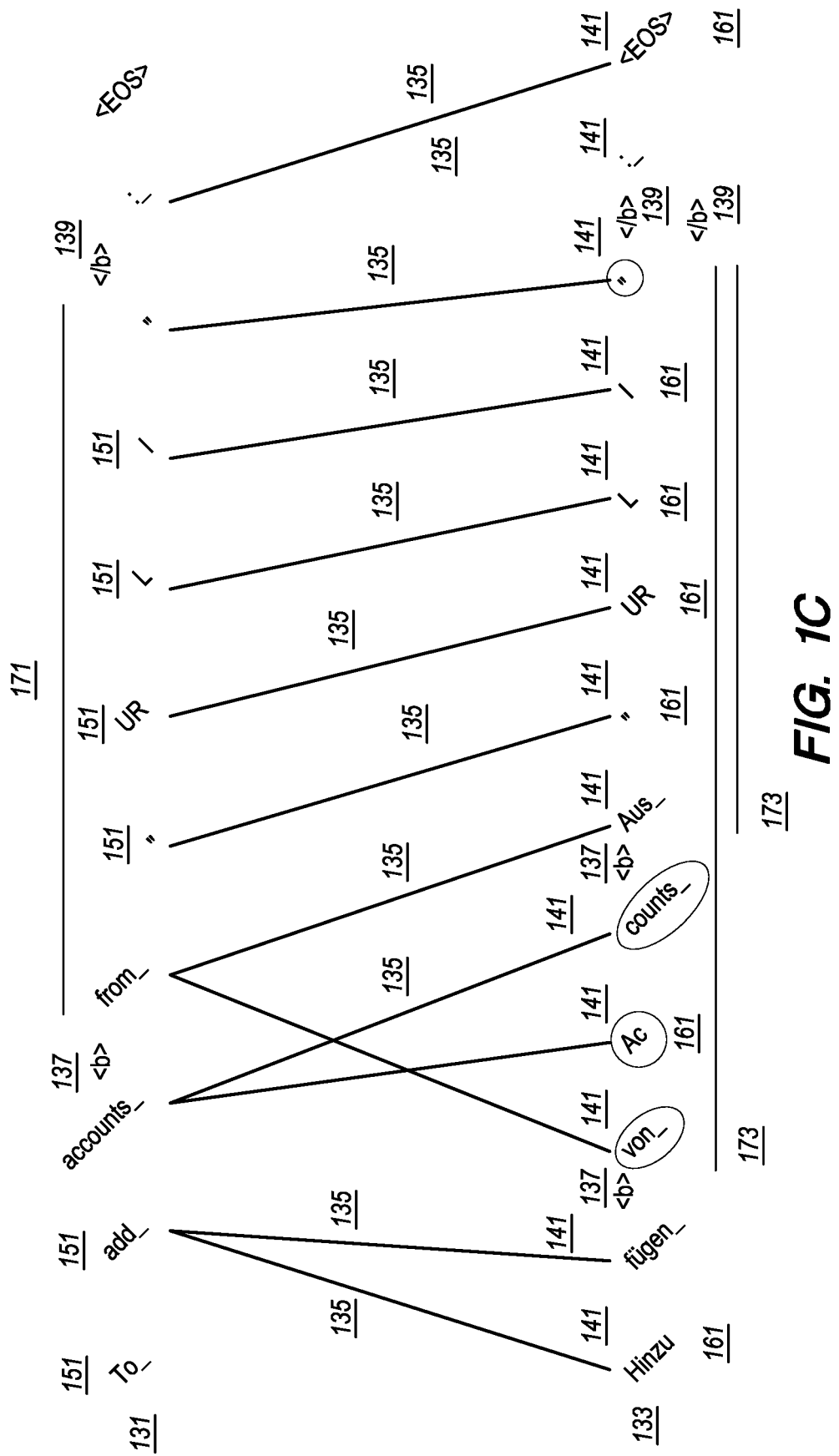
FIG. 1C illustrates a visualization of tag projection from an input sentence to an output sentence in one embodiment.

FIG. 1C illustrates a visualization of tag projection from an input sentence to an output sentence in an embodiment. In embodiments, there is an additional bias towards contiguity in projecting tags. FIG. 1C demonstrates how tags are projected in one such embodiment. A number of alignment links 135 are illustrated to exist between source tokens 151 in the source sentence 131 at the top and target tokens 161 in the target sentence 133 at the bottom. These alignment links 135 may correspond to hard alignments output by a neural model. The alignment links 135 connect source tokens 151 (such as "add_" or "accounts_") to target tokens 161 (such as "Hinzu" or "Ac") at a plurality of corresponding alignment points 141. A variety of types of tags in a source sentence may need to be projected into a target sentence. Some of these tags may span only a single source token. In certain instances, opening tags 137 and closing tags 139, such as the opening and closing bolding html tags <b> and </b> respectively, illustrated in source sentence 131, must be projected into a target sentence 133. Tags, such as opening and closing tags, may span multiple source tokens in a source sentence.

As illustrated in FIG. 1C, in an embodiment, a source tag span 171 can be characterized to contain all source tokens 151 between an opening tag 137 (e.g., "<b>") and a closing tag 139 (e.g., "</b>"), e.g. ("from_#URL1#") in a source sentence 131. One way to project a source tag span 171 into a target sentence 133 is to select a leftmost (e.g., "von") and rightmost (e.g., "#") target token 161 aligned (by an alignment link 135) to at least one source token 151 in the source tag span 171. In FIG. 1C, such a method would result in a target tag span 173 comprising "von Accounts aus #URL1#". The aforementioned strategy may be suboptimal because an automatic alignment system may make errors and not all alignment links are necessarily correct (e.g., the alignment link 135 "from" to "von" is shown as an error that an automatic system made). As will be explained, a different, preferable target tag span 173, such as "aus #URL1#" may be calculated by another method.

In an embodiment, a method that may be more resilient to alignment errors when projecting a source tag span 171 into a target sentence 133 as a target tag span 173 involves using calculated alignment scores to bias towards contiguity. Given a source tag span 171, for each possible target span 173, the alignment score of that target span 173 may be calculated by: (1) counting the number of alignment points 141 corresponding to target tokens 161 in the target tag span 173 aligned to at least one source token 151 in the source tag span 171 (such alignment points may be termed "consistent alignment points"); (2) counting the number of alignment points 141 corresponding to target tokens 161 in the target tag span 173 not aligned to even one source token 151 in the source tag span 171, but which are aligned to at least one source token 151 outside of the source tag span 171 (such alignment points may be termed "inconsistent alignment points"); and subtracting the number of inconsistent alignment points from the number of consistent alignment points. To find what may be a best target span, an embodiment comprises calculating an alignment score for each possible target tag span 173 and selecting the target tag span 173 with the highest score. Thus, unaligned target tokens in a possible target tag span may not count at all in determining the number of consistent alignment points or inconsistent alignments points for an alignment score, in an embodiment.

In an embodiment, unaligned target tokens in a possible target tag span may be counted towards consistent alignment points. In an embodiment, unaligned target tokens in a possible target tag span may be counted towards inconsistent alignment points. In other embodiments, unaligned target tokens in a possible target tag span may count with a small score (e.g., 0.1) when determining a number of inconsistent alignment points in a target tag span, but may also count with a similar, but smaller, score (e.g., 0.9) when determining a number of inconsistent alignment points in a target tag span. This more complex method of handling unaligned target tokens may have the effect of breaking ties for which unaligned tokens are at the border of a target tag span towards a smaller span. For example, assume "a" is unaligned in the target tag span; then, "Er will <b>Arzt</b> werden"→"He wants to become a <b>doctor</b>" may be a generated projection instead of "Er will <b>Arzt</b> werden"→"He wants to become <b>a doctor</b>". However, this more complex method may still correctly generate the projection "Er will <b>Arzt werden</b>"→"He wants to <b>become a doctor</b>".

FIG. 1C depicts two possible target tag spans 173 out of all possible target tag spans (there are N*(N+1)/2 possible target spans for a target sentence consisting of N tokens, as each tag span can be specified by its leftmost and rightmost token). For example, the span from "von_" to "#" has a score of five (7−2=5) and the span from "aus_" to "#" has a score of six (6−0=6). For the scenario depicted in FIG. 1C, calculating the score for all possible target tag spans 173 would reveal the span from "aus_" to "#" as having the highest score. Therefore, the bolding tags could be projected around the target tag span 173 from "aus_" to "#", resulting in a segment of the target sentence 133 being tagged as: "<b>aus #URL1#</b>". In an embodiment, if two or more spans had the same alignment score, then one of those spans that is the smallest may be chosen at random for tag projection. In other embodiments, another method may be used to break ties. Such an alternative method may be based on the principle that if a source tag span includes x % of the source tokens of a source sentence, then a corresponding target tag span should also cover about x % of the target tokens of a corresponding target sentence.

Other embodiments may make use of additional information extractable from a neural model, for example by factoring in attention probabilities A. In an embodiment, instead of counting hard alignment links, attention probabilities may be incorporated in tag projection. Each alignment link may be given a probability. Instead of counting consistent and inconsistent alignment points, respective probabilities may be summed or multiplied to calculate an alignment score for a possible target span. In other embodiments, tags are projected using another method, model, or heuristic.

Figure 1D:
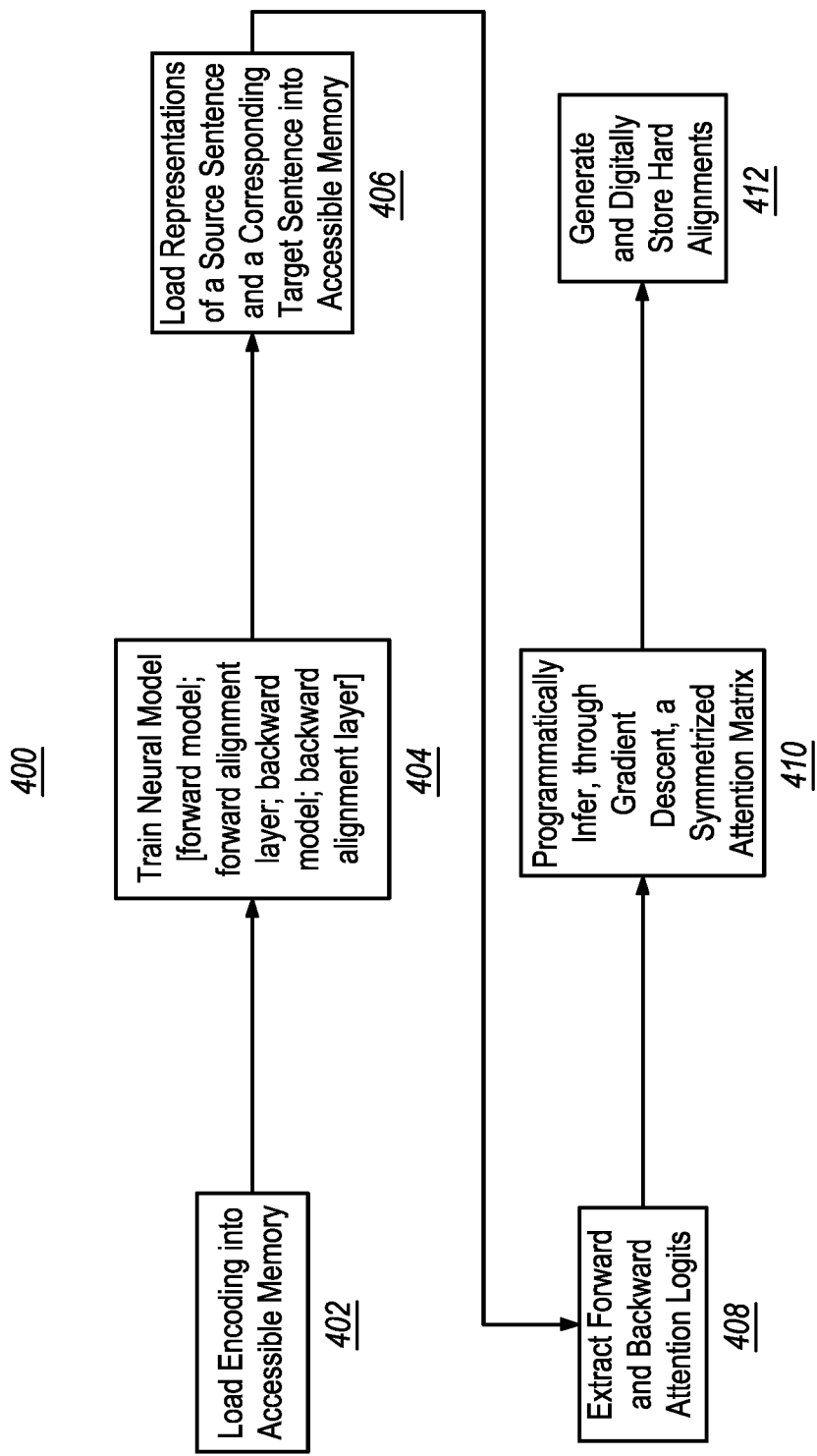
FIG. 1D illustrates an example computer-implemented method of generating hard alignments, in an embodiment.

FIG. 1D illustrates an example computer-implemented method of generating hard alignments, in an embodiment. Example method 400 may begin at step 402 with loading an encoding, comprising a tokenized vocabulary of a source language and a target language into accessible memory, such as main memory of a computer. The encoding may be a joint byte pair encoding which comprises a tokenized shared vocabulary, or another type of encoding.

At step 404 of FIG. 1D, in an embodiment, machine learning models may be trained for translation and alignment generation-tasks. Models that may be trained at step 404, using the encoding, comprise a forward neural model programmed for translating from the source language to the target language, a forward alignment layer that is programmatically coupled to the forward neural model, a backward neural model for translating from the target language to the source language, and a backward alignment layer that is programmatically coupled to the backward neural model. Each of the forward neural model and the backward neural model may comprise a Transformer submodel with a multilayer encoder, a multilayer decoder, multidimensional hidden states, and multidimensional embedding vectors, and each of the forward alignment layer and the backward alignment layer may comprise an attention optimization sub-network programmed to find predictive attention activations while encouraging contiguity, adjacent source words being biased to align to adjacent target words by using an auxiliary loss function.

At step 406 of FIG. 1D, in an embodiment, representations of a source sentence and a target sentence may be loaded into accessible memory. Step 406 may comprise storing, in computer main memory, a pairing comprising a source representation of a source sentence associated with the source language and a corresponding target representation of a target sentence associated with the target language. The representation of the target sentence may be obtained by running the source sentence through a machine learning translation model.

At step 408 of FIG. 1D, in an embodiment, forward attention logits are extracted from the forward alignment layer and backward attention logits are extracted from the backward alignment layer, each of these extractions depending on the source representation and the target representation.

At step 410 of FIG. 1D, in an embodiment, gradient descent may be used to programmatically infer a symmetrized attention matrix that jointly optimizes the likelihood of the pairing under the forward neural model and the backward neural model. Gradient descent may be initialized with an average of the extracted forward and backward attention logits.

At step 412 of FIG. 1D, in an embodiment, a plurality of first hard alignments between source words comprising source tokens in the source sentence and target words comprising target tokens in the target sentence may be generated and digitally stored, based on the symmetrized attention matrix.

2.8 Experimental Results 2.8.1 Data and Training

Various embodiments of the disclosed technology have been tested and found surprisingly effective. Testing has been conducted on various language pairs, including German→English, Romanian→English, and English→French. A joint byte pair encoding (BPE) can be learned for the source and target language with 40,000 merge operations. An implementation may use the techniques set forth in R. Sennrich et al., "Neural machine translation of rare words with subword units," *Proceedings of the 54th Annual Meeting of the Association for Computational Linguistics (Volume 1: Long Papers)*, pages 1715-1725, Berlin, Germany, Association for Computational Linguistics (2016), and the reader of the present disclosure is presumed to understand those techniques. To convert from alignments between word pieces to alignments between words, a source word may be aligned to a target word if an alignment link exists between any of its word pieces.

Notably, using BPE units instead of words also improved results for GIZA++ (e.g., 20.9% vs. 18.9% for German→English in a single direction). Therefore, the exact same input data may be used for GIZA++ and the neural approaches of various embodiments. For optimal performance, the training pipeline of GIZA++ relies on multiple iterations of IBM Model 1, Model 3, Model 4, and the HMM alignment model. Initialized with parameters from previous models, each subsequent model adds more assumptions about world alignments. Model 2 introduces non-uniform distortion, and Model 3 introduces fertility. Model 4 and the HMM alignment model introduce relative distortion, where the likelihood of the position of each alignment link is conditioned on the position of the previous alignment link. For training GIZA++ five iterations each were used for Model 1, the HMM model, Model 3 and Model 4.

Many language pairs may not contain an adequately sized development set for word alignment experiments. Therefore, rather than early stopping, a fixed number of updates was used for each training stage across language pairs: 90,000 for training the translation model, 10,000 for the alignment layer, and 10,000 for guided alignment training (batch-size: 36,000 words). In an embodiment, training longer did not improve or degrade test-set AER on German→English; the AER only fluctuated by less than 1% when training the alignment layer for up to 20,000 updates while evaluating it every 2,000 updates.

In an embodiment, a base transformer was also trained with an alignment layer for German→English, but it achieved similar results in terms of AER; thus, the smaller model previously described in Section 2.2 of this disclosure was used for other language pairs. Various hyperparameters may be adopted in various embodiments. In an embodiment, the interpolation factor $\lambda$ for the contiguity loss was tuned on German→English, and hyperparameters were adopted according to Tables 5 & 6:

TABLE 5

Hyperparameters of the translation model.

| Hyperparameter | Value |
|---|---|
| Dropout Rate | 0.1 |
| Embedding Size | 256 |
| Hidden Units | 512 |
| Encoder Layers | 6 |
| Decoder Layers | 3 |
| Attention Heads Per Layer | 8 |

TABLE 6

Hyperparameters of the alignment layer.

| Hyperparameter | Value |
|---|---|
| Dropout Rate | 0.1 |
| Embedding Size | 256 |
| Hidden Units | 256 |
| Attention Heads | 1 |

2.8.2 Contiguity Loss Experiments

Embodiments were tested in ablation experiments for contiguity loss, and the results of these experiments can be found in Table 1, below. In a first experiment, contiguity loss was used during training and alignments were extracted from the forward pass using a single direction without application of attention optimization. An absolute improvement of 6.4% AER (34.2% to 27.8%) was observed after adding the contiguity loss during training.

TABLE 1

AER results with and without using the contiguity loss when extracting alignments from the forward pass or when using attention optimization for the language pair German→English.

| Method | No Contiguity | Contiguity |
|---|---|---|
| Forward | 34.2% | 27.8% |
| Att. Opt | 22.7% | 21.5% |

In an embodiment, attention optimization was then used to extract alignments from the model trained with contiguity loss. Adding the contiguity loss during attention optimization further improved the AER scores by 1.2%. An interpolation coefficient of $\lambda=1.0$ was used for contiguity loss, although another value for the interpolation coefficient would have also worked.

Figure 6A:
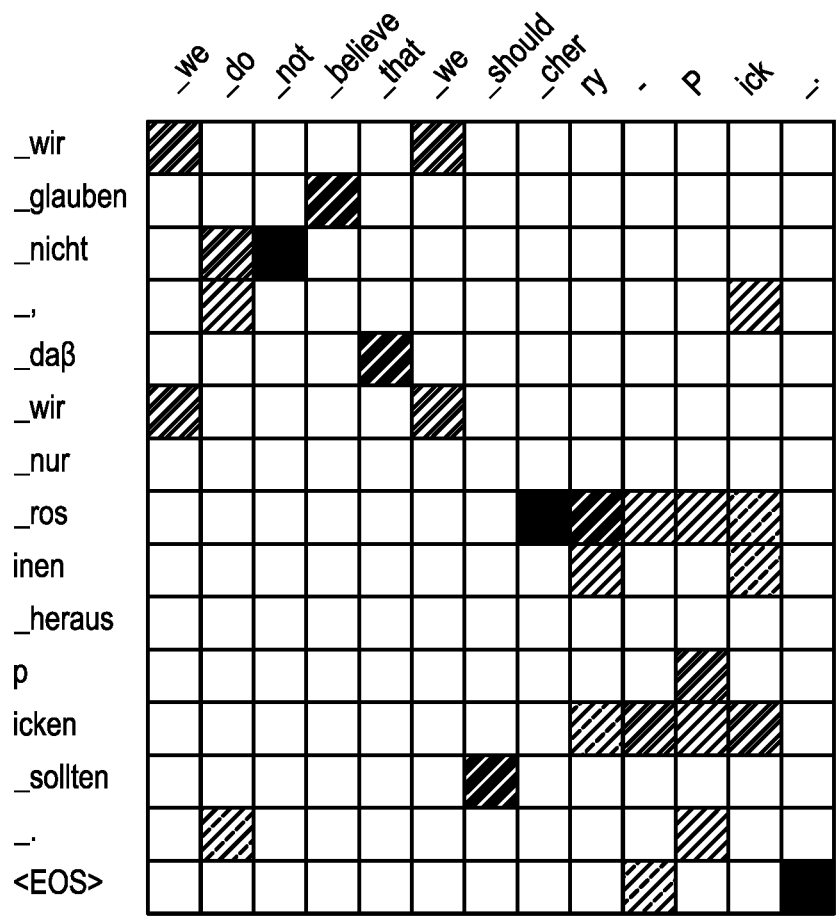
FIG. 6A illustrates example activations in an embodiment without an auxiliary loss function biasing against contiguity loss
Figure 6B:
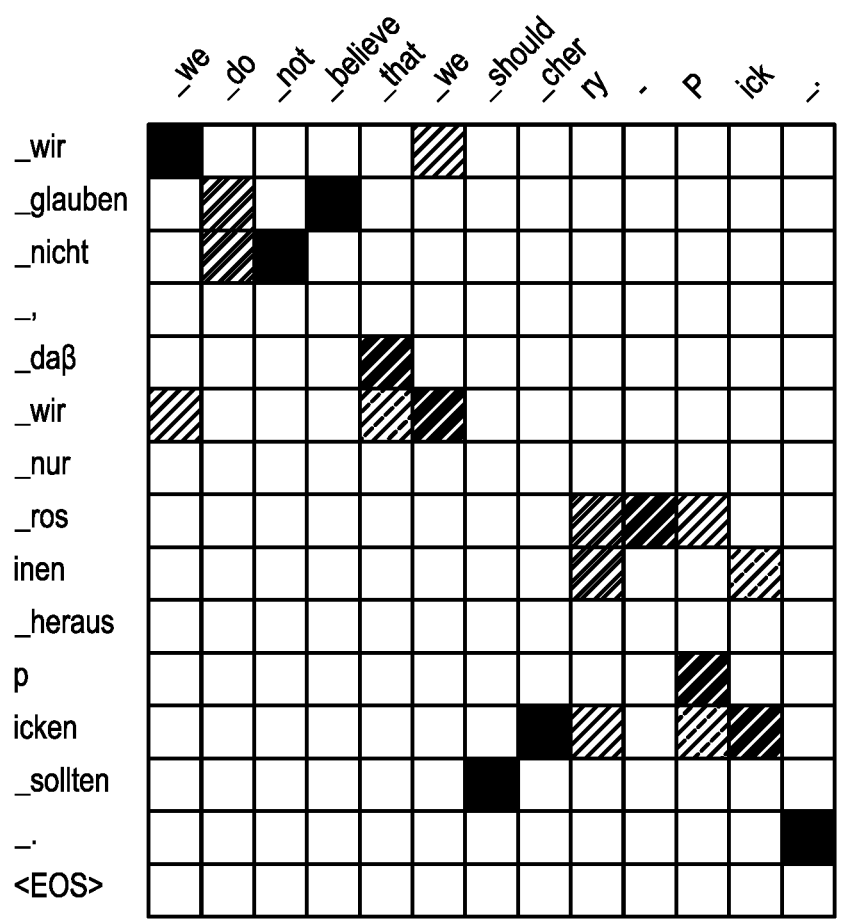
FIG. 6B illustrates example activations in an embodiment with an auxiliary loss function biasing against contiguity loss.

FIG. 6A illustrates example activations in an embodiment without an auxiliary loss function biasing against contiguity loss. FIG. 6B illustrates example activations in an embodiment with an auxiliary loss function biasing against contiguity loss. FIG. 6A, FIG. 6B illustrate that contiguity loss may lead to more sparse activations. Additionally, by favoring contiguous alignments, contiguity loss correctly disambiguated the alignment between the words "we" and "wir," which appear twice in the sentence pair. In additional experiments, described below, contiguity loss was used for both training and attention optimization.

A kernel of size 2×2 was used in each of the described experiments, but kernels of other sizes may be used, and were considered. In embodiments, using a 1×1 kernel during attention optimization led to an AER of 22.8%, while a 3×3 kernel achieved the best results with an AER of 21.2%, compared to 21.5% for the 2×2 kernel. In embodiments, larger kernel sizes led to slightly worse results: 21.4% for a 4×4 kernel and 21.5% for a 5×5 kernel.

2.8.3 Bidirectional Attention Optimization Experiments

In an embodiment, variants of grow-diagonal may be used to merge alignments from models trained in opposite directions. In an embodiment, hard alignments for both German→English and English→German were extracted with (monolingual) attention optimization, leading to an AER of 21.5% and 25.6%, respectively. In an embodiment, merging these alignments with grow-diagonal led to an AER of 19.6%, while grow-diagonal-final yielded an AER of 19.7%.

The interpolation factor λ was tuned for the contiguity loss during bidirectional attention optimization. A parameter of λ=1.0 led to an AER of 18.2%, while λ=2.0 led to an AER of 18.0%, and λ=5.0 led to an AER of 17.9%. In embodiments with bidirectional attention optimization, a higher λ may be selected for the contiguity loss compared to embodiments with unidirectional attention optimization, as λ is applied with the loss of the forward and backward models in bidirectional optimization.

In additional experiments, described below, λ=5.0 was used as the interpolation factor, although another value for the interpolation factor would have also worked. In an embodiment, bidirectional attention optimization improved the resulting AER compared to the grow-diagonal heuristic by up to 1.8% for German→English, as summarized in Table 2, below.

TABLE 2

Comparison of AER scores between bidirectional attention optimization and methods to merge hard alignments.

|  | AER |
|---|---|
| DeEn | 21.5% |
| EnDe | 25.6% |
| Grow-diag | 19.6% |
| Grow-diag-final | 19.7% |
| Bidir. Att. Opt | 17.9% |

In embodiments, variants of grow-diagonal must rely on hard alignments generated by forward and backward models. These variants must choose from these alignment links and therefore do not have the ability to generate new alignment links.

Figure 7A:
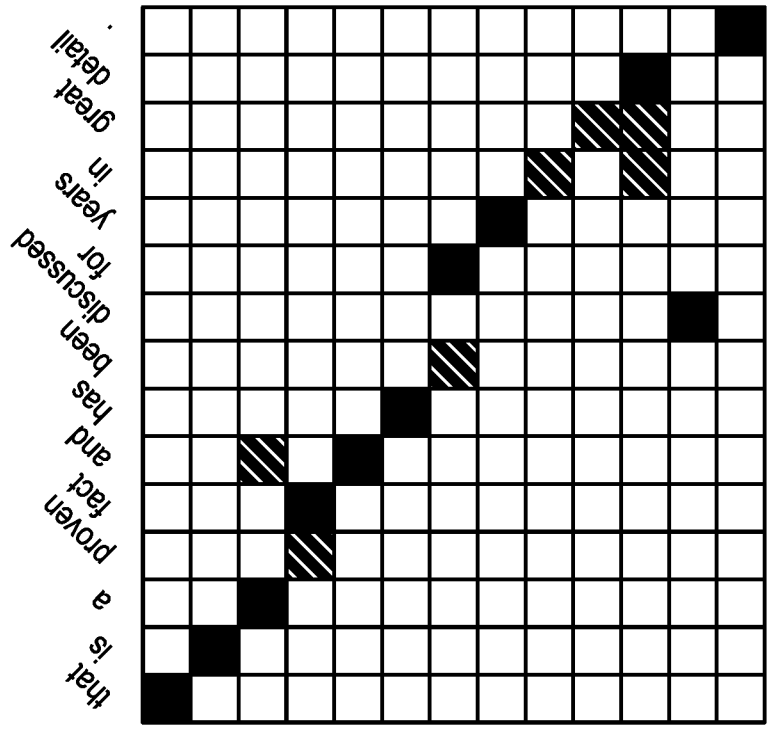
FIG. 7A illustrates a union of the alignments generated using a forward model and a backward model for a sentence pair, in an embodiment.
Figure 7B:
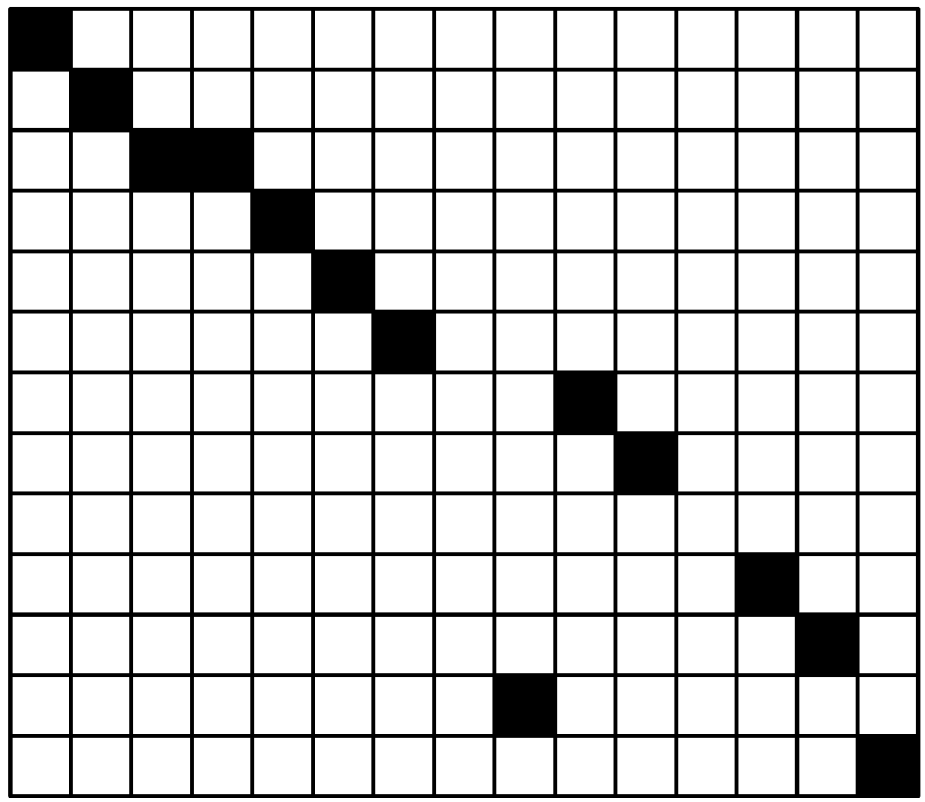
FIG. 7B illustrates alignments generated by an embodiment using bidirectional attention optimization for the sentence pair of FIG. 7A, in an embodiment.
Figure 7C:
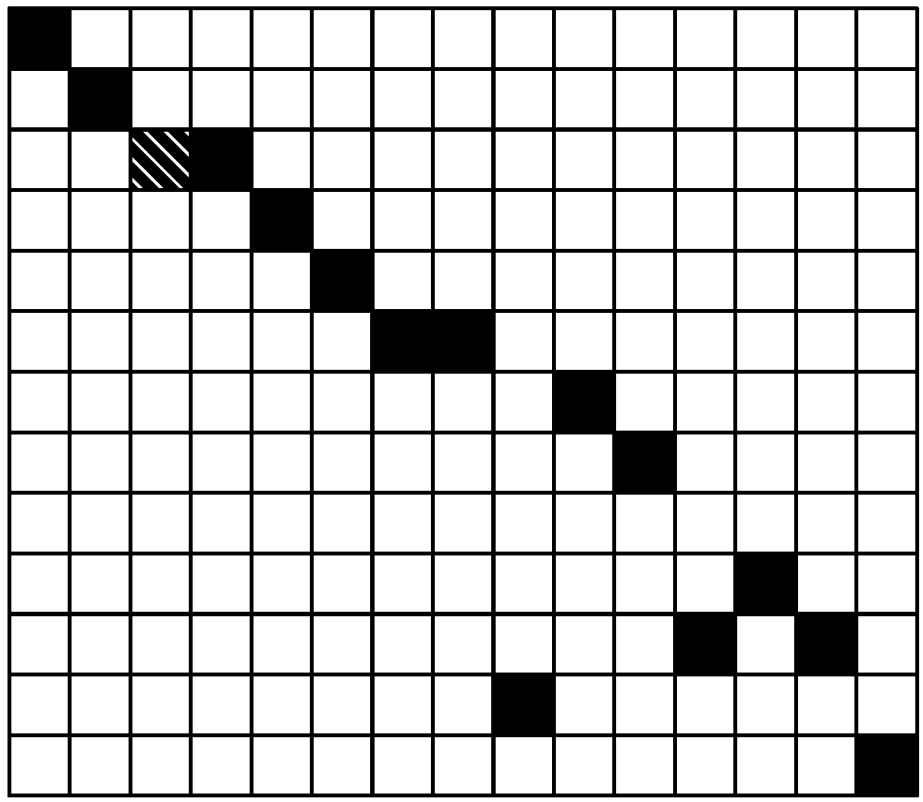
FIG. 7C illustrates gold alignments for the sentence pair of FIG. 7A, FIG. 7B.

In contrast, bidirectional attention optimization may take the parameters of underlying models into account and optimize the underlying attention logits simultaneously for both models to fit a sentence pair. FIG. 7A illustrates a union of the alignments generated using a forward model and a backward model for a sentence pair, in an embodiment. FIG. 7B illustrates alignments generated by an embodiment using bidirectional attention optimization for a sentence pair, in an embodiment. FIG. 7C illustrates gold alignments for the sentence pair of FIG. 7A, FIG. 7B. Comparing FIG. 7A, FIG. 7B, FIG. 7C show how bidirectional optimization may correctly predict an alignment link between "übereinstimmend" and "proven" that did not appear at all in the individual alignments generated using a forward and backward model.

Figure 5:
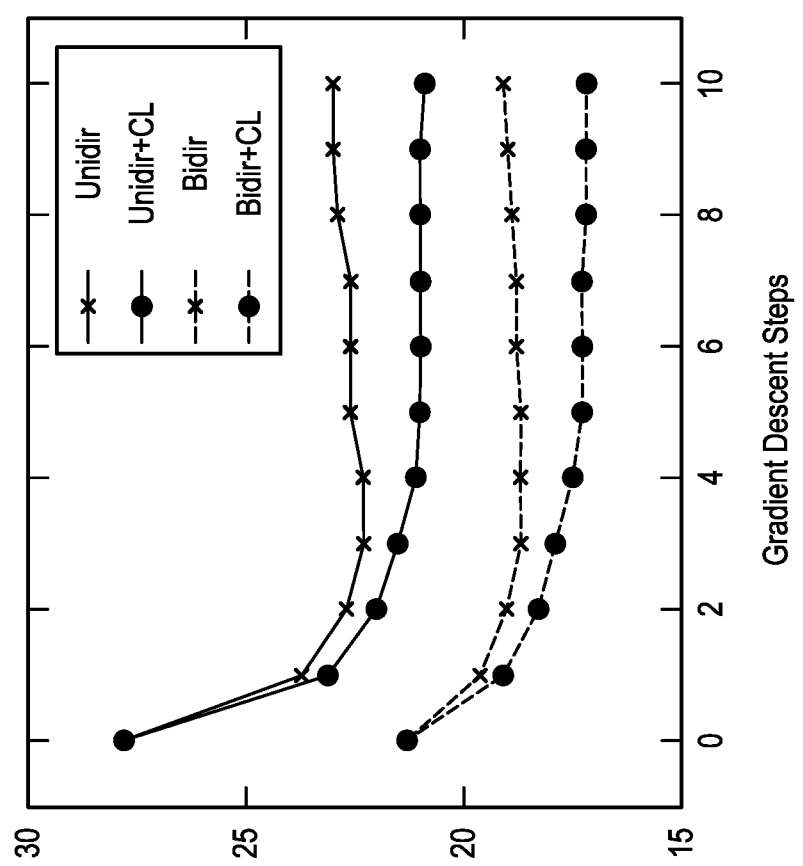
FIG. 5 illustrates the behavior of an embodiment using attention optimization with a varying number of gradient descent steps.

FIG. 5 illustrates the behavior of an embodiment using attention optimization with a varying number of gradient descent steps. For both unidirectional and bidirectional models, attention optimization led to steadily improving results. Without using the additional contiguity loss, the lowest AER appeared after three gradient descent steps and slightly increased with additional steps. In an embodiment using the contiguity loss, AER results continued to decrease with additional steps. Using the contiguity loss may stabilize optimization to avoid overfitting of the optimized attention activations when tuning for a single sentence pair.

2.8.4 Guided Alignment Training

Embodiments were tested which used the alignment layer with the full decoder context by adding an additional self-attention layer that does not mask out the future target context. Alignments were extracted from the previous models with bidirectional attention optimization and used for guided alignment training. The embodiments worked surprisingly well based upon the past experience of the inventors with other techniques and were recognized, in an inventive moment, as providing a distinct advance in the state of the art.

In an embodiment, the alignments used for training yielded an AER of 17.9% after bidirectional attention optimization, as seen in Table 4, below. In an embodiment, the full context model trained with these alignments had a further improved AER of 16.0% while using a single model for German→English, as seen in Table 3, below. After guided alignment training was complete, attention optimization was not applied in these embodiments, since that would have required a distribution over target words, which is not available in these embodiments.

TABLE 3

Comparison of unidirectional models with GIZA++.

| Method | DeEn | EnFr | RoEn |
|---|---|---|---|
| Att. Opt. + Guided | 21.5% | 15.0% | 29.2% |
|  | 16.0% | 6.6% | 23.4% |
| GIZA++ | 18.9% | 7.9% | 27.3% |

TABLE 4

Comparison of neural alignment approaches with GIZA++ after using symmetrization of the forward and backward model.

| Method | DeEn | EnFr | RoEn |
|---|---|---|---|
| Bidir. Att. Opt. + Guided | 17.9% | 8.4% | 24.1% |
|  | 16.3% | 5.0% | 23.4% |
| GIZA++ | 18.7% | 5.5% | 26.5% |

3. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
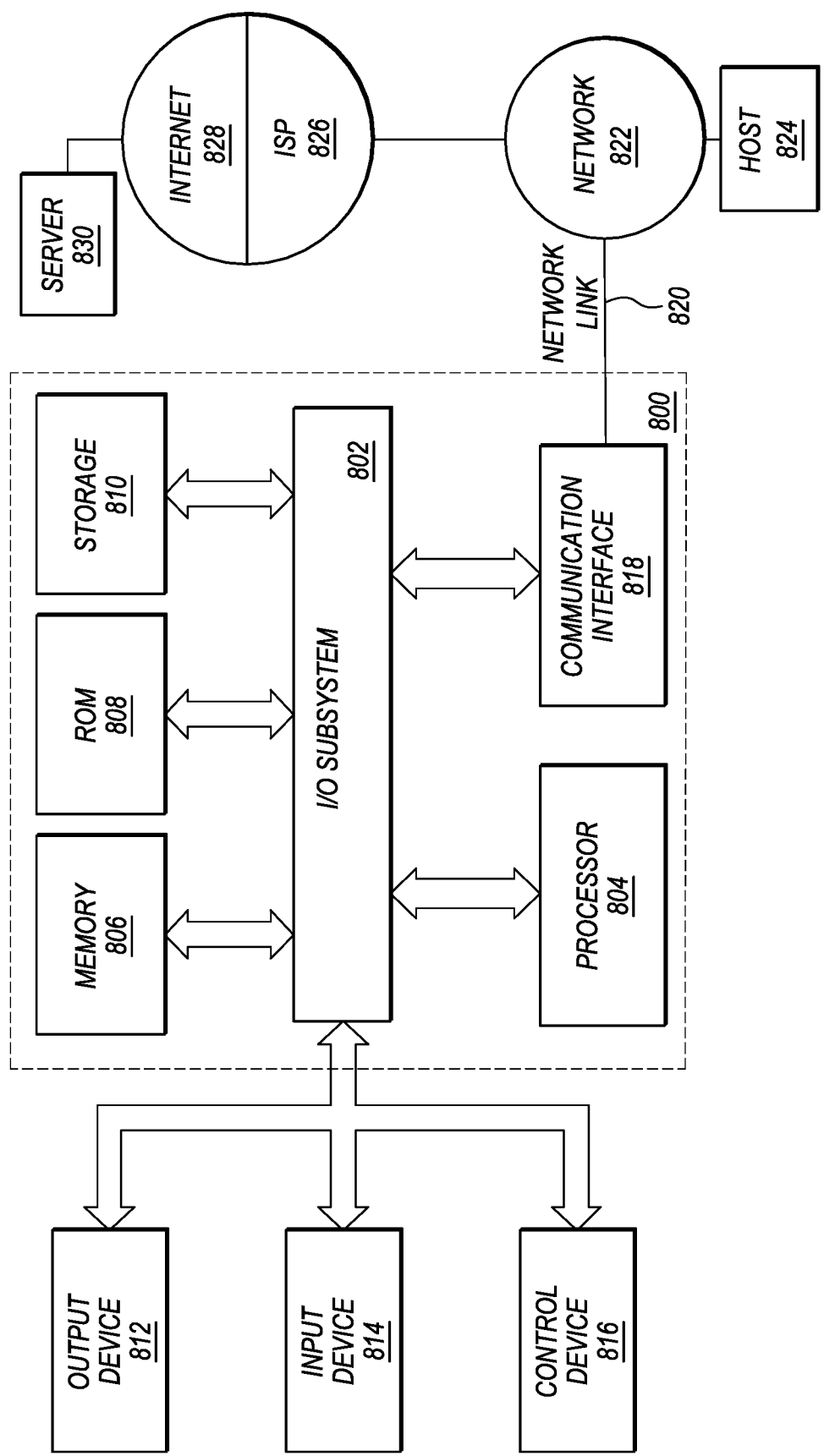
FIG. 8 is a block diagram that illustrates an example computer system with which an embodiment may be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
storing, in computer main memory, an encoding comprising a tokenized vocabulary of a source language and a target language;
training, using the encoding, a forward neural model programmed for translating from the source language to the target language, a forward alignment layer that is programmatically coupled to the forward neural model, a backward neural model for translating from the target language to the source language, and a backward alignment layer that is programmatically coupled to the backward neural model,
each of the forward neural model and the backward neural model comprising a Transformer submodel with a multilayer encoder, a multilayer decoder, multidimensional hidden states, and multidimensional embedding vectors, and each of the forward alignment layer and the backward alignment layer comprising an attention optimization sub-network programmed to find predictive attention activations while encouraging contiguity, adjacent source words being biased to align to adjacent target words by using an auxiliary loss function;
storing, in computer main memory, a pairing comprising a source representation of a source sentence associated with the source language and a corresponding target representation of a target sentence associated with the target language;
extracting, based on the source representation and the target representation, forward attention logits from the forward alignment layer and backward attention logits from the backward alignment layer;
programmatically inferring, through gradient descent that is initialized with an average of the extracted forward and backward attention logits, a symmetrized attention matrix that jointly optimizes the likelihood of the pairing under the forward neural model and the backward neural model; and
generating and digitally storing, based on the symmetrized attention matrix, a plurality of first hard alignments between source words comprising source tokens in the source sentence and target words comprising target tokens in the target sentence.

2. The method of claim 1, each Transformer submodel comprising a 6-layer encoder, a 3-layer decoder, 8 attention heads per layer, 256-dimensional hidden states, and 256-dimensional embedding vectors; each alignment layer comprising 256-dimensional hidden states, 256-dimensional embedding vectors, and one attention head; and each Transformer submodel and each alignment layer using a dropout rate of 0.1.

3. The method of claim 1, further comprising generating the first hard alignments by generating one or more alignment links that programmatically associate one or more source tokens with one or more target tokens, and generating a first hard alignment between each source word and each target word respectively comprising a source token and a target token programmatically associated by an alignment link.

4. The method of claim 3, further comprising:
projecting, based on the generated first hard alignments, one or more tags from the source sentence to the target sentence, including at least one of underlining, an HTML tag, an XML tag, an SGML tag, a LaTeX tag, italicization, a sentiment annotation, an entity annotation, an intent annotation, a relationship annotation, highlighting, coloring, bolding, superscript, subscript, strikethrough, font, a comment, a footnote, or a link; and storing, in computer main memory, the target sentence with the projected tags.

5. The method of claim 4, further comprising projecting the one or more tags based on the generated first hard alignments by executing:

determining, for each opening tag corresponding to a closing tag in the source sentence, a corresponding source tag span;

calculating, for each corresponding source tag span, an alignment score for every possible target tag span; and projecting, into the target sentence, from each corresponding source tag span to a possible target tag span with the highest alignment score, the opening and closing tags.

6. The method of claim 1, the first hard alignments being generated by:

transforming the attention logits from the symmetrized attention matrix into forward and backward attention probabilities using a softmax( ) function;

merging the forward and backward attention probabilities into attention scores using a Hadamard product; and selecting min(n, m) alignments that have the highest values in the merged attention scores, wherein n is a number of source tokens and m is a number of target tokens.

7. The method of claim 1, further comprising:

programmatically uncoupling the forward alignment layer and the backward alignment layer from the forward neural model and the backward neural model respectively;

programmatically coupling a guided alignment layer comprising an unmasked self-attention sublayer to the forward neural model and the backward neural model;

training, with a plurality of hard alignments that includes the first hard alignments, using the encoding, the guided alignment layer;

storing, in computer main memory, a second pairing comprising a second source representation of a second source sentence associated with the source language and a corresponding second target representation of a second target sentence associated with the target language;

extracting, based on the second source representation and the second target representation, guided attention logits from the guided alignment layer; and generating, based on the extracted guided attention logits, guided hard alignments between second source words comprising second source tokens in the second source sentence and second target words comprising second target tokens in the second target sentence.

8. The method of claim 7, each Transformer submodel comprising a 6-layer encoder, a 3-layer decoder, 8 attention heads per layer, 256-dimensional hidden states, and 256-dimensional embedding vectors;

the forward and backward alignment layer each comprising 256-dimensional hidden states, 256-dimensional embedding vectors, and one attention head; and each Transformer submodel and each of the forward and backward alignment layer using a dropout rate of 0.1.

9. The method of claim 7, further comprising generating the guided hard alignments by generating one or more alignment links that programmatically associate one or more second source tokens with one or more second target tokens, and generating a guided hard alignment between each second source word and each second target word respectively comprising a second source token and a second target token programmatically associated by an alignment link.

10. The method of claim 9, further comprising:

projecting, based on the generated guided hard alignments, one or more tags from the second source sentence to the second target sentence, including at least one of underlining, an HTML tag, an XML tag, an SGML tag, a LaTeX tag, italicization, a sentiment annotation, an entity annotation, an intent annotation, a relationship annotation, highlighting, coloring, bolding, superscript, subscript, strikethrough, font, a comment, a footnote, or a link; and storing, in computer main memory, the second target sentence with the projected tags.

11. The method of claim 10, further comprising projecting the one or more tags based on the generated guided hard alignments by executing:

determining, for each opening tag corresponding to a closing tag in the second source sentence, a corresponding source tag span;

calculating, for each corresponding source tag span, an alignment score for every possible target tag span; and projecting, into the second target sentence, from each corresponding source tag span to a possible target tag span with the highest alignment score, the opening and closing tags.

12. The method of claim 1, further comprising:

programmatically uncoupling the forward alignment layer and the backward alignment layer from the forward neural model and the backward neural model respectively;

programmatically coupling a guided alignment layer comprising an unmasked self-attention sublayer to the forward neural model;

training, with a plurality of hard alignments that includes the first hard alignments, using the encoding, the guided alignment layer;

storing, in computer main memory, a second pairing comprising a second source representation of a second source sentence associated with the source language and a corresponding second target representation of a second target sentence associated with the target language;

extracting, based on the second source representation and the second target representation, guided attention logits from the guided alignment layer; and generating, based on the extracted guided attention logits, guided hard alignments between second source words comprising second source tokens in the second source sentence and second target words comprising second target tokens in the second target sentence.

13. The method of claim 12, each Transformer submodel comprising a 6-layer encoder, a 3-layer decoder, 8 attention heads per layer, 256-dimensional hidden states, and 256-dimensional embedding vectors;

the forward and backward alignment layer each comprising 256-dimensional hidden states, 256-dimensional embedding vectors, and one attention head; and each Transformer submodel and each of the forward and backward alignment layer using a dropout rate of 0.1.

14. The method of claim 12, further comprising generating the guided hard alignments by generating one or more alignment links that programmatically associate one or more second source tokens with one or more second target tokens, and generating a guided hard alignment between each second source word and each second target word respectively comprising a second source token and a second target token programmatically associated by an alignment link.

15. The method of claim 14, further comprising:
projecting, based on the generated guided hard alignments, one or more tags from the second source sentence to the second target sentence, including at least one of underlining, an HTML tag, an XML tag, an SGML tag, a LaTeX tag, italicization, a sentiment annotation, an entity annotation, an intent annotation, a relationship annotation, highlighting, coloring, bolding, superscript, subscript, strikethrough, font, a comment, a footnote, or a link; and
storing, in computer main memory, the second target sentence with the projected tags.

16. The method of claim 15, further comprising projecting the one or more tags based on the generated guided hard alignments by executing:
determining, for each opening tag corresponding to a closing tag in the second source sentence, a corresponding source tag span;
calculating, for each corresponding source tag span, an alignment score for every possible target tag span; and
projecting, into the second target sentence, from each corresponding source tag span to a possible target tag span with the highest alignment score, the opening and closing tags.

17. A non-transitory computer-readable storage medium storing one or more instructions which, when executed by one or more processors, cause the one or more processors to perform steps comprising:
storing, in computer main memory, an encoding comprising a tokenized vocabulary of a source language and a target language;
training, using the encoding, a forward neural model programmed for translating from the source language to the target language, a forward alignment layer that is programmatically coupled to the forward neural model, a backward neural model for translating from the target language to the source language, and a backward alignment layer that is programmatically coupled to the backward neural model,
each of the forward neural model and the backward neural model comprising a Transformer submodel with a multilayer encoder, a multilayer decoder, multidimensional hidden states, and multidimensional embedding vectors, and each of the forward alignment layer and the backward alignment layer comprising an attention optimization sub-network programmed to find predictive attention activations while encouraging contiguity, adjacent source words being biased to align to adjacent target words by using an auxiliary loss function;
storing, in computer main memory, a pairing comprising a source representation of a source sentence associated with the source language and a corresponding target representation of a target sentence associated with the target language;
extracting, based on the source representation and the target representation, forward attention logits from the forward alignment layer and backward attention logits from the backward alignment layer;
programmatically inferring, through gradient descent that is initialized with an average of the extracted forward and backward attention logits, a symmetrized attention matrix that jointly optimizes the likelihood of the pairing under the forward neural model and the backward neural model; and
generating and digitally storing, based on the symmetrized attention matrix, a plurality of first hard alignments between source words comprising source tokens in the source sentence and target words comprising target tokens in the target sentence.

18. The non-transitory computer-readable storage medium of claim 17, the steps further comprising:
programmatically uncoupling the forward alignment layer and the backward alignment layer from the forward neural model and the backward neural model respectively;
programmatically coupling a guided alignment layer comprising an unmasked self-attention sublayer to the forward neural model and the backward neural model;
training, with a plurality of hard alignments that includes the first hard alignments, using the encoding, the guided alignment layer;
storing, in computer main memory, a second pairing comprising a second source representation of a second source sentence associated with the source language and a corresponding second target representation of a second target sentence associated with the target language;
extracting, based on the second source representation and the second target representation, guided attention logits from the guided alignment layer; and
generating, based on the extracted guided attention logits, guided hard alignments between second source words comprising second source tokens in the second source sentence and second target words comprising second target tokens in the second target sentence.

19. A computer system, comprising:
one or more processors;
a memory comprising a set of instructions which when executed causes the one or more processors to execute a method, the method comprising:
storing, in computer main memory, an encoding comprising a tokenized vocabulary of a source language and a target language;
training, using the encoding, a forward neural model programmed for translating from the source language to the target language, a forward alignment layer that is programmatically coupled to the forward neural model, a backward neural model programmed for translating from the target language to the source language, and a backward alignment layer that is programmatically coupled to the backward neural model,
each of the forward neural model and the backward neural model comprising a Transformer submodel with a multilayer encoder, a multilayer decoder, multidimensional hidden states, and multidimensional embedding vectors, and
each of the forward alignment layer and the backward alignment layer comprising an attention optimization sub-network programmed to find predictive attention activations while encouraging contiguity, adjacent source words being biased to align to adjacent target words, by using an auxiliary loss function;
storing, in computer main memory, a pairing comprising a source representation of a source sentence associated with the source language and a corresponding target representation of a target sentence associated with the target language;

extracting, based on the source representation and the target representation, forward attention logits from the forward alignment layer and backward attention logits from the backward alignment layer;

programmatically inferring, through gradient descent that is initialized with an average of the extracted forward and backward attention logits, a symmetrized attention matrix that jointly optimizes the likelihood of the pairing under the forward neural model and the backward neural model; and generating and digitally storing, based on the symmetrized attention matrix, a plurality of first hard alignments between source words comprising source tokens in the source sentence and target words comprising target tokens in the target sentence.

20. The computer system of claim 19, the method further comprising:

programmatically uncoupling the forward alignment layer and the backward alignment layer from the forward neural model and the backward neural model respectively;

programmatically coupling a guided alignment layer comprising an unmasked self-attention sublayer to the forward neural model and the backward neural model;

training, with a plurality of hard alignments that includes the first hard alignments, using the encoding, the guided alignment layer;

storing, in computer main memory, a second pairing comprising a second source representation of a second source sentence associated with the source language and a corresponding second target representation of a second target sentence associated with the target language;

extracting, based on the second source representation and the second target representation, guided attention logits from the guided alignment layer; and generating, based on the extracted guided attention logits, guided hard alignments between second source words comprising second source tokens in the second source sentence and second target words comprising second target tokens in the second target sentence.

* * * * *